US012200444B2

(12) United States Patent
Petersen et al.

(10) Patent No.: US 12,200,444 B2
(45) Date of Patent: Jan. 14, 2025

(54) HEARING AID CONFIGURED TO PERFORM A RECD MEASUREMENT

(71) Applicant: Oticon A/S, Smørum (DK)

(72) Inventors: Svend Oscar Petersen, Smørum (DK); Karsten Bo Rasmussen, Smørum (DK); Steen Michael Munk, Smørum (DK)

(73) Assignee: Oticon A/S, Smørum (DK)

(*) Notice: Subject to any disclaimer, the term of this patent is extended or adjusted under 35 U.S.C. 154(b) by 105 days.

(21) Appl. No.: 18/083,207

(22) Filed: Dec. 16, 2022

(65) Prior Publication Data

US 2023/0199411 A1 Jun. 22, 2023

(30) Foreign Application Priority Data

Dec. 17, 2021 (EP) .................................... 21215573

(51) Int. Cl.
*H04R 25/00* (2006.01)

(52) U.S. Cl.
CPC ........... *H04R 25/30* (2013.01); *H04R 25/505* (2013.01); *H04R 2225/021* (2013.01); *H04R 2225/025* (2013.01)

(58) Field of Classification Search
CPC .................. H04R 25/30; H04R 25/505; H04R 2225/021; H04R 2225/025
USPC .................................... 381/60, 312–315, 57
See application file for complete search history.

(56) References Cited

U.S. PATENT DOCUMENTS

| | | | | |
|---|---|---|---|---|
| 1,825,281 A * | 9/1931 | Parsons | G06M 1/346 74/425 |
| 6,658,122 B1 * | 12/2003 | Westermann | H04R 25/70 381/312 |
| 7,365,669 B1 * | 4/2008 | Melanson | G10K 11/17819 704/E21.014 |
| 8,045,737 B2 * | 10/2011 | Stirnemann | H04R 25/70 381/318 |
| 2007/0217639 A1 * | 9/2007 | Stirnemann | H04R 25/70 381/95 |

(Continued)

FOREIGN PATENT DOCUMENTS

EP 3 038 384 A1 6/2016

*Primary Examiner* — William J Deane, Jr.
(74) *Attorney, Agent, or Firm* — Birch, Stewart, Kolasch & Birch, LLP

(57) ABSTRACT

A method of estimating a real-ear-to-coupler-difference (RECD) in a hearing is provided. The hearing aid comprises an input transducer; an output transducer; and an ITE-part configured to define a residual volume when mounted in an ear canal of a user. The method comprises providing an earpiece configured to fit tightly to walls of an ear canal of the user and to provide said residual volume; that the earpiece comprises at least one ventilation channel or opening; a sound outlet allowing sound from said output transducer to be played into said residual volume; characteristics of the at least one ventilation channel or opening; a frequency dependent feedback path estimate from said output transducer to said input transducer through said ventilation channel or opening; and estimating a low-frequency and high frequency RECD values in dependence said feedback path estimate; and determining estimated frequency dependent RECD values in dependence of said estimated low-frequency RECD value, and said estimated high-frequency RECD value.

20 Claims, 10 Drawing Sheets

(56) References Cited

U.S. PATENT DOCUMENTS

| | | | | |
|---|---|---|---|---|
| 2008/0260192 | A1* | 10/2008 | Yanz | H04R 25/70 381/330 |
| 2010/0202642 | A1* | 8/2010 | LoPresti | A61B 5/036 381/321 |
| 2013/0075255 | A1* | 3/2013 | Moon | G01N 27/18 204/427 |
| 2014/0321657 | A1* | 10/2014 | Stirnemann | H04R 25/606 381/60 |
| 2015/0172839 | A1* | 6/2015 | Rung | H04R 25/70 381/60 |
| 2016/0112814 | A1* | 4/2016 | Hug | H04R 25/70 381/60 |
| 2019/0096089 | A1* | 3/2019 | Jones | G06T 7/74 |
| 2023/0009826 | A1* | 1/2023 | Jin | H04R 25/558 |

* cited by examiner

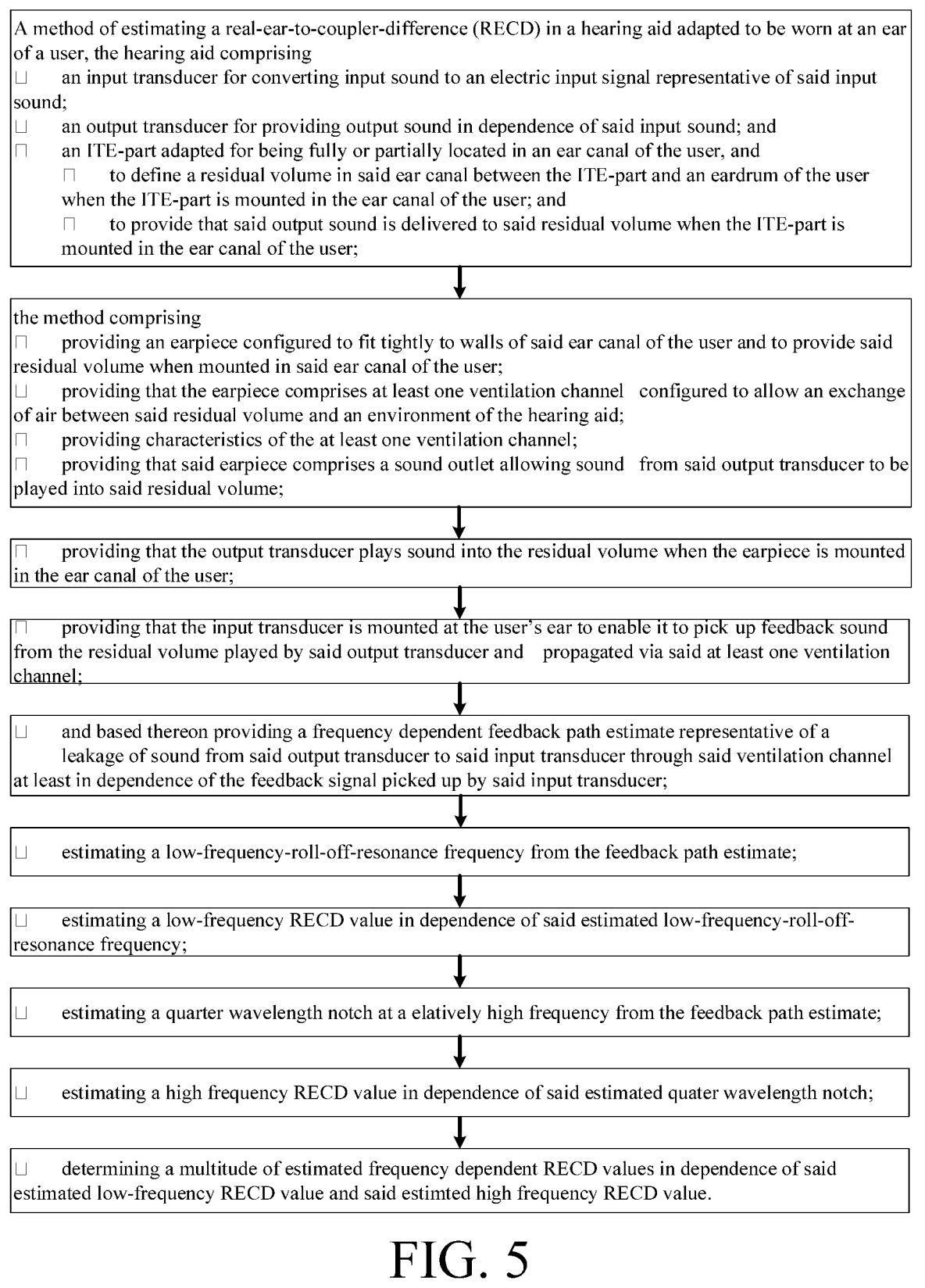

A method of estimating a real-ear-to-coupler-difference (RECD) in a hearing aid adapted to be worn at an ear of a user, the hearing aid comprising

- an input transducer for converting input sound to an electric input signal representative of said input sound;
- an output transducer for providing output sound in dependence of said input sound; and
- an ITE-part adapted for being fully or partially located in an ear canal of the user, and
  - to define a residual volume in said ear canal between the ITE-part and an eardrum of the user when the ITE-part is mounted in the ear canal of the user; and
  - to provide that said output sound is delivered to said residual volume when the ITE-part is mounted in the ear canal of the user;

↓ the method comprising

- providing an earpiece configured to fit tightly to walls of said ear canal of the user and to provide said residual volume when mounted in said ear canal of the user;
- providing that the earpiece comprises at least one ventilation channel configured to allow an exchange of air between said residual volume and an environment of the hearing aid;
- providing characteristics of the at least one ventilation channel;
- providing that said earpiece comprises a sound outlet allowing sound from said output transducer to be played into said residual volume;

↓

- providing that the output transducer plays sound into the residual volume when the earpiece is mounted in the ear canal of the user;

↓

- providing that the input transducer is mounted at the user's ear to enable it to pick up feedback sound from the residual volume played by said output transducer and propagated via said at least one ventilation channel;

↓

- and based thereon providing a frequency dependent feedback path estimate representative of a leakage of sound from said output transducer to said input transducer through said ventilation channel at least in dependence of the feedback signal picked up by said input transducer;

↓

- estimating a low-frequency-roll-off-resonance frequency from the feedback path estimate;

↓

- estimating a low-frequency RECD value in dependence of said estimated low-frequency-roll-off-resonance frequency;

↓

- estimating a quarter wavelength notch at a elatively high frequency from the feedback path estimate;

↓

- estimating a high frequency RECD value in dependence of said estimated quater wavelength notch;

↓

- determining a multitude of estimated frequency dependent RECD values in dependence of said estimated low-frequency RECD value and said estimted high frequency RECD value.

FIG. 5

HEARING AID CONFIGURED TO PERFORM A RECD MEASUREMENT

TECHNICAL FIELD

The present disclosure relates to hearing aids, in particular to the fitting of a hearing aid to the needs of a particular user, e.g. to provide an appropriate gain to compensate for a hearing impairment of the user. Typically, an appropriate (prescribed) gain is determined from an audiogram (or similar data) documenting a frequency dependent hearing threshold of the user. Based thereon, and possibly on further data of the user's hearing ability, the appropriate gain to compensate for the frequency dependent hearing loss of the user is determined using a fitting rationale (e.g. based on standardized (NAL-NL1, NAL-NL2, DSL i/o, etc.), or proprietary fitting algorithms). The prescribed gain should ideally (in the particular hearing aid fitted to and assuming that it is appropriately mounted at or in an ear of the user) provide a sound pressure level at the user's eardrum at a given frequency that is larger than the user's hearing threshold at that frequency. A fitting rationale typically provides a user-specific gain 'assuming' a standardized volume of the user's ear canal, e.g. a residual volume between an ITE-part (e.g. being constituted by or comprising an earpiece) located in the ear canal and the user's eardrum. Such standardized volume may e.g. be represented by a standard acoustic coupler. To determine an appropriate (prescribed) gain that provides the necessary sound pressure level to the particular user, knowledge of the specific acoustic properties of the user's ear (e.g. volume of the cavity that the hearing aid 'plays into') is required. This is sometimes represented by the parameter Real-ear-to-coupler-difference.

Real-ear-to-coupler-difference (RECD) is defined as the difference in dB as a function of frequency between a sound pressure level (SPL) measured in the real-ear (of the particular user) and in a standard acoustic coupler (e.g. 2 $cm^3$, often written as 2-cc, or an 'IEC 711 coupler' (based on ANSI standard TEC 60318-4:2010), etc.), as produced by a transducer (e.g. a loudspeaker) generating the same (acoustic) input signal in both cases.

EP3038384A1 deals with estimating RECD. By making a feedback measurement simultaneously with the RECD measurement (e.g. during a fitting session), a reference feedback measurement can be stored and used to adjust the gain estimated by the RECD measurement during later use of the hearing aid. If, e.g., the feedback path has increased compared to the reference feedback measurement next time the ear mould is mounted (indicating an increased leakage of sound from the output to the input transducer, e.g. due to non-optimal mounting of the hearing aid), an increase of the low frequency gain compared to the gain estimated by the RECD measurement may be provided. Contrary, if the feedback path has decreased compared to the reference measurement (implying less leakage), a decrease of the low frequency gain may be provided.

The present disclosure further relates to estimation of an actual or effective size of a ventilation channel (termed 'vent') in a hearing aid. The effective vent size is here understood as the dimension of the (hypothetical) vent providing the combined effect of a) the predetermined ventilation channel, other leakages than through the predetermined vent, and optionally dirt etc. in the vent. The effective vent size may vary on a daily basis (e.g. if the hearing aid is differently mounted from one day to the next) or even more frequently as the physical conditions change (e.g. head/body movements, temperature, moist, etc.). The earpiece of the hearing aid may slide a little in the ear, the device may be removed and reinserted, humidity may build up and partially block the vent channel, etc.

SUMMARY

The present disclosure relates to a method of estimating real-ear-to-coupler-difference (RECD). The present disclosure relates to a hearing aid adapted to be worn by a user and configured to use existing components of the hearing aid (e.g. an on-board feedback manager and stored data) to provide an estimate of the user's individual RECD. Optionally, a passive (e.g. customized), separate earpiece may be used together with a part of the hearing aid to provide the RECD estimate. The separate earpiece may be specifically adapted to allow sound from an output transducer of the hearing aid to reach the eardrum of the user during the RECD estimation.

Other features related to fitting of a hearing aid to a user's needs are presented in the present disclosure.

A Method of Estimating RECD:

In an aspect of the present application, a method of estimating a real-ear-to-coupler-difference (RECD) in a hearing aid adapted to be worn at an ear of a user is provided. The hearing aid comprises

- an input transducer for converting input sound to an electric input signal representative of said input sound;
- an output transducer for providing output sound in dependence of said input sound; and
- an ITE-part (e.g. comprising or being constituted by an earpiece) adapted for being located fully or partially in an ear canal of the user, and
  - to define a residual volume in said ear canal between the ITE-part and an eardrum of the user when the ITE-part is mounted in the ear canal of the user; and
  - to provide that said output sound is delivered to said residual volume when the ITE-part is mounted in the ear canal of the user.

The method comprises

- providing an earpiece (e.g. a customized earpiece) configured to fit tightly to walls of said ear canal of the user and to provide said residual volume when mounted in said ear canal of the user;
- providing that the earpiece comprises at least one ventilation channel or opening configured to allow an exchange of air between said residual volume and an environment of the hearing aid;
- providing that said earpiece comprises a sound outlet allowing sound from said output transducer to be played into said residual volume;
- providing characteristics of the at least one ventilation channel or opening;
- providing that the output transducer plays sound into the residual volume when the earpiece is mounted in the ear canal of the user;
- providing that the input transducer is mounted at the user's ear to enable it to pick up feedback sound from the residual volume played by said output transducer and propagated via said at least one ventilation channel or opening;
- and based thereon providing a frequency dependent feedback path estimate representative of a leakage of sound from said output transducer to said input transducer through said ventilation channel or opening at least in dependence of the feedback signal picked up by said input transducer.

The method may further comprise,

- estimating a low-frequency-roll-off-resonance frequency from said feedback path estimate;
- estimating a low-frequency RECD value in dependence of said estimated low-frequency-roll-off-resonance frequency;
- estimating a quarter wavelength notch at a relatively high frequency from the feedback path estimate;
- estimating a high-frequency RECD value in dependence of said estimated quarter wavelength notch; and
- determining estimated frequency dependent RECD values in dependence of said estimated low-frequency RECD value and said estimated high-frequency RECD value.

Thereby an alternative method of estimating RECD may be provided.

A low frequency may (in the present context) e.g. be below 3 kHz, such as below 2 kHz, e.g. below 1.5 kHz.

A relatively high frequency may e.g. be above 3 kHz, such as in a range between 3 kHz and 9 kHz.

The RECD estimate may be found in the following way,

Low frequency (LF) part of RECD: It is well known that the sound pressure in a small, enclosed cavity like an ear canal emitted from a known sound source (like a hearing aid speaker) will increase 6 dB in sound pressure level (SPL), if the volume is halved. This is especially true in the lower frequencies where the wavelength is much longer than the cavity dimensions. So, the LF-RECD level in the ear canal can be determined as:

$$RECD_{ear,LF} = 20\log_{10}\left(\frac{V_{2cc}}{V_{ear}}\right)$$

Hence, if $V_{ear}$ is half of $V_{2cc}$, then $RECD_{ear,LF}$ is 6 dB. And as outlined in the detailed description of embodiments in relation to the expression for the resonance frequency $f_{res}$ of the cavity (wherein the resonance frequency $f_{res}$ of the cavity is approximated by the low-frequency-roll-off-resonance frequency extracted from the feedback path estimate, e.g. where it starts to decline 12 dB/oct in the LF, e.g. below 3 kHz), we get:

$$RECD_{ear,LF} = 20\log_{10}\left(v_{2cc}\frac{l}{A}\left(f_{res,LF}\frac{2\pi}{v}\right)^2\right)$$

The high frequency part of the RECD estimate, is determined using the quarter wavelength notch frequency, either through a lookup table that correlates the quarter wavelength notch frequency to a high frequency RECD value (wherein the quarter wavelength notch frequency $f_{1/4}$ is approximated by the quarter wavelength notch at a relatively high frequency (e.g. above 3 kHz) from the feedback path estimate). This is also illustrated in FIG. 6. This correlation can be determined by measuring the notch frequency in a range of well-defined cavities, representing different ear canal sizes and shapes or through numerical simulation of different ear canal sizes and shapes.

The parameter 'real-ear-to-coupler-difference' (here abbreviated RECD) is typically defined without a ventilation channel (cf. e.g. [Dillon; 2001]).

Characteristics of the at least one ventilation channel or opening may e.g. comprise physical dimensions, material(s) from which the customized vent is/are made of, and/or acoustic mass.

A threshold frequency ($f_{TH}$) may be defined between a low-frequency region and a high frequency region. The low-frequency-roll-off-resonance frequency is a frequency (e.g. a range between 500 Hz and 1.5 kHz) in the low-frequency region below the threshold frequency ($f_{TH}$). The quarter wavelength notch at a relatively high frequency is a frequency (e.g. in a range between 5 kHz and 8 kHz) in the high-frequency region above the threshold frequency ($f_{TH}$). The threshold frequency may be dependent on the characteristics (e.g. dimensions) of the ventilation channel or opening and/or the dimensions of the ear canal. The threshold frequency ($f_{TH}$) may be in the range between 2 kHz and 4 kHz, e.g. between 2.5 kHz and 3.5 kHz, e.g. around 3 kHz.

The method may comprise

- providing said estimated frequency dependent RECD values in dependence of said estimated low-frequency RECD value and said estimated high-frequency RECD value and predefined measured and/or simulated data for different ventilation channels or openings, and different dimensions of said residual volume.

The different (at least one) ventilation channels may exhibit different length, different cross-section (e.g. including different area and form), different filler material (if any, other than air), different acoustic mass, etc. The different residual volumes may exhibit different length, and different cross-section (e.g. including different area and form). Corresponding values of real ear to coupler difference (RECD) (relative to a specific standard coupler, e.g. 2 cc, or 711) for combinations of different ventilation channels and residual volumes may be mapped over frequency and stored (e.g. measured or theoretically determined, e.g. based on vent and ear canal models). The different (frequency dependent) data (e.g. graphs) corresponding to different residual volumes may be associated with an average age of a person (e.g. based on statistical data over ear canal sizes versus age). The RECD data for a given vent (e.g. characterized by a specific acoustic mass ($m_a$)) and a given residual volume ($V_a$) may preferably comprise at least a low-frequency part ($RECD_{LF}$) and a high-frequency part ($RECD_{HF}$). The low-frequency part ($RECD_{LF}$) preferably comprises an RECD value at the vent-roll-off resonance ($f_e$). The high-frequency part ($RECD_{HF}$) preferably comprises an RECD value at the quarter wavelength resonance ($f_{1/4}$). In other words, values of RECD (e.g. in dB)—at least—at the vent-roll-off frequency ($f_c$) ($RECD_{LF}(m_a, V_a, f_c)$ and at the quarter wavelength resonance ($f_{1/4}$) ($RECD_{HF}(m_a, V_a, f_{1/4})$ for different ventilation channels ($m_a$) and different residual volumes ($V_a$) are assumed to be available for a method according to the present disclosure, see e.g. FIG. 6. The (effective acoustic) residual volumes at low frequency and high frequency may be different (see e.g. FIG. 1 and associated description).

The (possibly customized, or otherwise adaptable or sealed) earpiece may be constituted by the part of the ITE, that interfaces the ear canal of the user. The earpiece of a 'receiver in the ear' (RITE) style hearing aid may e.g. comprise the speaker unit of the ITE part, and may e.g. include a silicon dome or other (more or less flexible) structure for guiding the earpiece in the ear canal.

The hearing aid may comprise a BTE-part adapted to be located at or behind the ear of the user. The BTE-part may comprise the output transducer, e.g. a loudspeaker. The hearing aid may comprise an acoustic tube arranged to propagate sound from the output transducer to the (e.g. customized) earpiece. The ITE-part may comprise the output transducer.

The ITE-part may (constitute or) comprise the earpiece. The earpiece may be an ear mould specifically adapted to the user's ear and forming part of the hearing aid during normal use. The earpiece of the ITE-part may be an earpiece forming part of or constituting the ITE-part. The earpiece of the ITE-part may comprise electronic components that need electric power to function (in other words, the earpiece of the ITE-part may be active (in an electronic sense)).

The earpiece (including the separate earpiece described in the following) may be arranged to fit tightly to the ear canal of a user to thereby provide a seal along a cross-sectional periphery (perpendicular to an axial direction of the earpiece) between the residual volume and the environment. The earpiece may comprise a sealing element of a flexible material allowing (a certain) adaptation to the form of the user's ear canal.

The earpiece (used in connection with the method of estimating RECD according to the present disclosure) may be a separate earpiece specifically adapted to support estimation of the real-ear-to-coupler-difference in the hearing aid. The separate, earpiece may be an ear mould specifically adapted to the user's ear (i.e. customized), but not used in normal operation of the hearing aid. The separate earpiece need not necessarily to be customized. The separate earpiece may be adapted to make a seal between walls of a user's ear canal and the earpiece. The separate earpiece may comprise a silicon dome, or be constituted by or comprise a foam part that can adapt to the form of a user's ear canal. The separate earpiece may e.g. be a disposable part that is solely used for the RECD measurement of a single user.

The separate, earpiece may be passive (in an electronic sense, in that it does not need electric power to provide its intended function).

The separate earpiece may thus be mounted in the ear canal of the user during measurements according to the method of the present disclosure. The separate earpiece may—(only) during measurements according to the method of the present disclosure—replace a (possibly customized) earpiece forming part of the hearing aid, e.g. forming part of or constituting the ITE-part, and which may be used during normal operation of the hearing aid.

The separate earpiece may be configured to have the same form and dimensions and speaker outlet as the earpiece of the hearing aid for which the RECD estimate is intended to be used. In particular, the form and dimension (see e.g. L in FIG. 7.) of the separate earpiece may be configured to provide that, when mounted in the ear canal of the user, it occludes the same residual volume (cf. RES-V (V1) in FIG. 1) as when the earpiece of the hearing aid is mounted in the user's ear canal.

The method may comprise

- Providing an effective vent size by estimating an acoustic transfer function for the at least one ventilation channel or opening based on an estimate of the feedback path from the loudspeaker to the input transducer of the hearing aid.

The acoustic transfer function for the vent may comprise A) a controlled, relatively fixed (time-invariant), part originating from a well-defined ventilation channel, and B) a less controlled, e.g. time variant, part originating from less well-defined leakage channels (e.g. openings in a dome, etc.).

The acoustic transfer function (the estimate of the feedback path) may be provided by a feedback estimation unit of the hearing aid.

A Self-Fitting Hearing Aid:

In an aspect of the present application, a self-fitting hearing aid adapted to be worn at and/or in an ear of a user is provided. The hearing aid comprises

- an input transducer for converting input sound to an electric input signal representative of said input sound;
- an output transducer for providing output sound in dependence of said input sound; and
- an earpiece adapted for being located fully or partially in an ear canal of the user, the earpiece being configured to define a residual volume in said ear canal between the earpiece and an eardrum of the user when the earpiece is mounted in the ear canal of the user; the earpiece comprising
  - at least one ventilation channel or opening configured to allow an exchange of air between said residual volume and an environment of the hearing aid;
  - a sound outlet allowing sound from said output transducer to be played into said residual volume when the ITE-part is mounted in the ear canal of the user;
- a feedback estimation system configured to provide a frequency dependent feedback path estimate representative of a leakage of sound from said output transducer to said input transducer through said ventilation channel or opening at least in dependence of the feedback signal picked up by said input transducer;
- a signal processor configured to execute processing algorithms of the hearing aid and to process data and extract processing parameters to be used by at least one of said processing algorithms;
- memory wherein
  - characteristics of the at least one ventilation channel or opening of the hearing aid, and
  - empirical data of real ear to coupler values (RECD) at a multitude of frequencies for different residual volumes and optionally for different characteristics of ventilation channels or openings, are stored;

wherein the input transducer is arranged in the hearing aid to enable it to pick up said leakage of sound from the residual volume played by said output transducer and propagated via said at least one ventilation channel or opening; wherein said signal processor—at least in a specific RECD estimation mode of operation of the hearing aid—is configured to estimate frequency dependent real ear to coupler values for said hearing aid when mounted in the ear canal of the user by

- estimating a low-frequency-roll-off-resonance frequency from said feedback path estimate;
- estimating a low-frequency RECD value in dependence of said estimated low-frequency-roll-off-resonance frequency and said stored empirical data;
- estimating a quarter wavelength notch at a relatively high frequency from said feedback path estimate;
- estimating a high-frequency RECD value in dependence of said estimated quarter wavelength notch and said stored empirical data; and
- determining estimated frequency dependent RECD values in dependence of said estimated low-frequency RECD value and said estimated high-frequency RECD value and said stored empirical data.

Thereby an improved—potentially self-fitting—hearing aid may be provided.

A larger or smaller number of empirical data of real ear to coupler values at a multitude of frequencies for different residual volumes (or associated user ages) and optionally for different characteristics of ventilation channels or openings (e.g. represented by different acoustic masses ($m_a$) of the ventilation channels) may be stored in memory. The empirical data for different residual volumes and optionally for different characteristics of ventilation channels or openings preferably include corresponding LF Helmholtz resonance frequencies and HF quarter wave cancellation frequencies. Such data may be used to select appropriate data, e.g. an appropriate curve (or interpolated curve), using the 'measured' low-frequency-roll-off-resonance frequency ($f_{c,m}$) and the quarter wavelength notch at a relatively high frequency ($f_{1/4,m}$) from the feedback path estimate as defined according to the present disclosure. In other words, the LF Helmholtz resonance frequency ($f_{c,i}$) and the HF quarter wave cancellation frequency ($f_{1/4,i}$) of the empirical RECD data are estimated by the low-frequency-roll-off-resonance frequency and the quarter wavelength notch at a relatively high frequency, respectively, as derived from the feedback path estimate as defined according to the present disclosure.

Data characterizing a hearing impairment of the user may be stored in memory of the hearing aid (or otherwise be accessible to the processor of the hearing aid). Data characterizing a hearing impairment of the user may comprise estimated hearing loss versus frequency for the user. Data characterizing a hearing impairment of the user may comprise measured hearing threshold versus frequency for the user (e.g. as a standard audiogram).

Data stored in memory of the hearing aid may be accessible to the signal processor.

The signal processor may be configured to run a fitting algorithm for determining frequency and/or level dependent gains in dependence of said data characterizing the user's hearing impairment and said estimated frequency dependent RECD values determined in the hearing aid.

The frequency and/or level dependent gains may be stored in memory of the hearing aid and applied by the at least one processing algorithm, e.g. a compression algorithm, executed by the signal processor to compensate an electrical input signal representing sound (picked up or received by the hearing aid) for the user's hearing impairment and for presentation of a thus improved signal to the user as audible sound.

A Hearing Aid:

In an aspect, a hearing aid adapted to be worn at an ear of a user is provided by the present disclosure. The hearing aid comprises

- an input transducer for converting input sound to an electric input signal representative of said input sound;
- an output transducer for providing output sound in dependence of said input sound; and
- an ITE-part (e.g. comprising or being constituted by an earpiece) adapted for being located fully or partially in an ear canal of the user and configured to
  - define a residual volume in said ear canal between the ITE-part and an eardrum of the user when the ITE-part is mounted in the ear canal of the user; and to
  - provide that said output sound is delivered to said residual volume when the ITE-part is mounted in the ear canal of the user; and to
  - allow an exchange of air between said residual volume and an environment of the hearing aid, when the ITE-part is mounted in the ear canal of the user.

The hearing aid may be configured to participate in performing the method of estimating a real-ear-to-coupler-difference (RECD) as described above, in the detailed description of embodiments and in the claims.

It is intended that some or all of the structural features of the method described above, in the 'detailed description of embodiments' or in the claims can be combined with embodiments of the hearing aid, when appropriately substituted by a corresponding structural feature and vice versa. Embodiments of the hearing aid may have the same advantages as the corresponding method.

The hearing aid may be configured to comprise a programming interface to a programing device, e.g. a fitting system, for configurating parameters of the hearing aid to user's personal needs.

The ITE-part of the hearing aid may comprise (or be constituted by) the (possibly customized) earpiece.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input transducer may comprise a vibration sensor for converting a vibration in bone or flesh to an electric input signal representing sound. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise antenna and transceiver circuitry allowing a wireless link to an entertainment device (e.g. a TV-set), a communication device (e.g. a telephone), a wireless microphone, a programming device, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g. The hearing aid may comprise an earpiece (or a pair of earpieces) and a separate processing part, e.g. worn at an ear or elsewhere at or on the user's body.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid. A mode of operation may include a specific RECD estimation mode and/or a specific a specific vent size estimation mode. The specific vent size estimation mode may form part of the specific RECD estimation mode.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The number of detectors may comprise a feedback estimation detector configured to provide a (e.g. frequency dependent) measure of a current feedback from an output transducer to an input transducer of the hearing aid. The feedback measure may e.g. be provided by an appropriately coupled adaptive filter.

The hearing aid may comprise a feedback estimation unit (e.g. comprising or constituting the feedback estimation detector) configured to estimate a feedback path from the output transducer to an input transducer of the hearing aid (in a normal mode of operation, as well as in an RECD estimation mode and/or in a specific a specific vent size estimation mode of the hearing aid). An estimate of the feedback path may be provided as an estimate of the acoustic transfer function from the output transducer to an input transducer of the hearing aid.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network, e.g. a recurrent neural network, such as a gated recurrent unit (GRU).

The hearing aid may comprise an acoustic (and/or mechanical) feedback control (e.g. suppression) and/or echo-cancelling system (e.g. comprising the feedback estimation unit and/or the feedback estimation detector). Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. The hearing aid may comprise a hearing instrument adapted for being fully or partially implanted in the head of a user, e.g. in the form of a bone conduction hearing aid or a cochlear implant type hearing aid. A hearing system may comprise a speakerphone (comprising a number of input transducers and a number of output transducers, e.g. for use in an audio conference situation), e.g. comprising a beamformer filtering unit, e.g. providing multiple beamforming capabilities.

A Hearing Aid Earpiece Combination:

A hearing aid earpiece combination is further provided by the present disclosure. The hearing aid earpiece combination comprises a hearing aid as described above, in the detailed description of embodiments, and in the claims, and a separate (e.g. customized) earpiece, wherein the separate earpiece is specifically adapted to support in the process of estimating a real-ear-to-coupler-difference in the hearing aid (and the user) as described above, in the detailed description of embodiments, and in the claims.

The separate (e.g. customized) earpiece may e.g. be entirely passive, e.g. an ear mold comprising a speaker outlet (or feedthrough) and a well-defined ventilation channel (passive in the sense that it does not need a power supply, e.g. in that it does not contain electronic components).

The separate earpiece may be configured to fit tightly to walls of an ear canal of the user and to provide the residual volume when mounted in the ear canal of the user. The separate earpiece may comprise

- at least one ventilation channel configured to allow an exchange of air between the residual volume and an environment of the hearing aid, the ventilation channel having known characteristics;
- a sound outlet allowing sound from the output transducer of the hearing aid to be played into the residual volume.

The separate earpiece preferably has an outer form and size equal to (an earpiece of) the ITE-part of the hearing aid. The separate earpiece is preferably configured to be positioned at the same location in the ear canal of the user as (the earpiece of) the ITE-part of the hearing aid, when (the earpiece of) the ITE-part is mounted in the ear canal of the user.

Use:

In an aspect, use of a hearing aid (or hearing aid earpiece combination) as described above, in the 'detailed description of embodiments' and in the claims, is moreover provided. Use of a hearing aid (or hearing aid earpiece combination) for estimating a current RECD may be provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application. The data processing system may e.g. comprise or form part of a programming device, e.g. a fitting system for a hearing aid.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the hearing aid or hearing system via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

The auxiliary device may comprise a fitting system.

A Programming Device, e.g. a Fitting System:

A fitting system for configurating parameters of a hearing aid to user's personal needs is further provided by the present disclosure. The fitting system may be configured to participate in performing the method of estimating a real-ear-to-coupler-difference (RECD) s described above, in the 'detailed description of embodiments', and in the claims.

The fitting system may comprise a programming interface to the hearing aid allowing the fitting system to exchange date with the hearing aid, including to configure parameters of the hearing aid to user's personal needs.

An APP:

In a further aspect, a non-transitory application, termed an APP, is furthermore provided by the present disclosure. The APP comprises executable instructions configured to be executed on an auxiliary device to implement a user interface for a hearing aid described above in the 'detailed description of embodiments', and in the claims. The APP may be configured to run on cellular phone, e.g. a smartphone, or on another portable device allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 5 shows a flow diagram of an embodiment of a method of estimating a real ear to coupler difference in a hearing aid adapted to be worn by a user, FIG. 6 schematically shows exemplary recorded data for RECD versus frequency for different ear canal sizes.

The figures are schematic and simplified for clarity, and they just show details which are essential to the understanding of the disclosure, while other details are left out. Throughout, the same reference signs are used for identical or corresponding parts.

Figure 1:
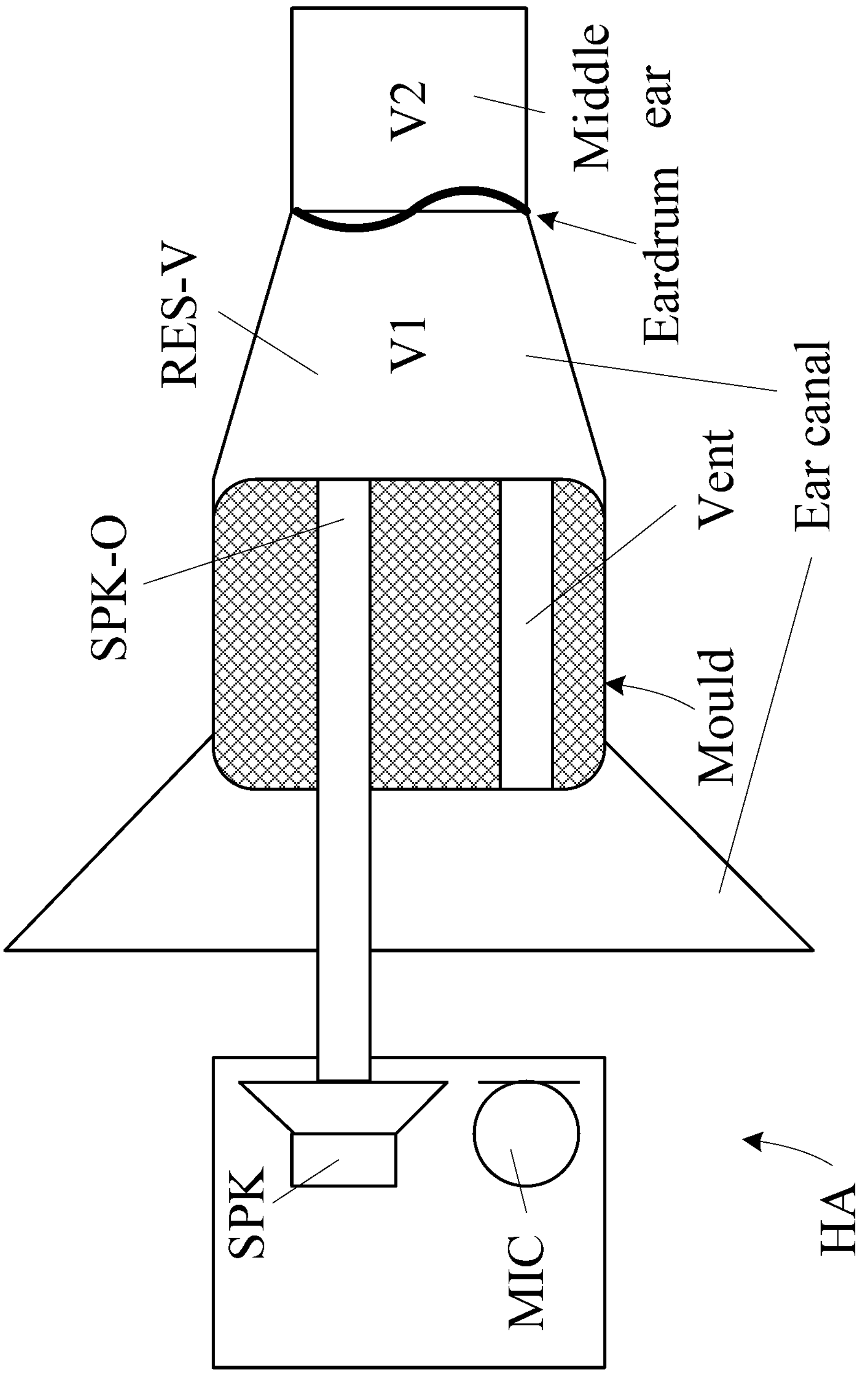
FIG. 1 schematically shows a hearing aid comprising an ITE-part adapted to be located at or in an ear canal or the user, FIG. 2 schematically shows a standard Helmholtz resonator and the relation between its resonance frequency and design parameters of the cavity and its connecting tube.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to a hearing aid adapted to be worn by a user and configured to use an on-board feedback manager to measure the user's individual real ear to coupler difference (RECD).

Real-ear-to-coupler-difference (RECD) is defined as the difference in dB as a function of frequency between a sound pressure level (SPL) measured in the real-ear (of the particular user) and in a standard acoustic coupler (e.g. 2 $cm^3$, often written as 2-cc, or an IEC 711 coupler, etc.), as produced by a transducer (e.g. a loudspeaker) generating the same (acoustic) input signal in both cases. RECD is hence defined without presence of a ventilation channel. The definition of RECD is using the 2-cc coupler as reference.

But using a 711 coupler, RECD can be calculated, by knowing the difference between the 2-cc and the 711 coupler.

To make the fitting of a hearing instrument more precise, it is in general desired to know the users individual Real Ear to Coupler Difference (RECD), and especially for small children who do not give subjective feedback about their fitted gain. The size of the residual cavity of the ear canal occluded with the instrument is affecting the RECD value, so in a smaller ear the RECD values are higher than in a larger ear, and that is because that the smaller air volume in the smaller ear results in a higher sound pressure. The term In-SITU RECD is used when the RECD is measured in the user's own ear and preferably with the users own hearing aid mould.

The traditional way of measuring the RECD values are with a probe tube microphone placed next to the ear mould and with the tip of the probe tube as close to the eardrum as possible, while a loudspeaker is playing a signal (e.g. broad band noise or a stepped pure tone sweep) via a tubing into the ear canal at the same time. The same measurement is then repeated into a 2 cc (or other standard) coupler, and the difference between the real ear measurement and the coupler measurement gives you the RECD.

In various other setups, where the hearing instrument itself can measure the In-SITU RECD, the probe tube is either connected to one of the existing microphones in the hearing instrument or a microphone in an adaptor shoe connected to the hearing instrument. The speaker in the hearing instrument is then used to emit the acoustical signal for the measurement.

The problem with the abovementioned methods is that it either requires an external measurement system to measure the RECD, or some additional adaptors for the hearing instruments to measure the in-situ RECD with the instrument itself. Additionally, it is also required to place a probe tube next to the ear mould and at a particular position relative to the eardrum.

The solution presented in the present disclosure, has the main advantage that there is no need for a probe tube microphone, and potentially no need for extra equipment or adaptors to measure the In-SITU RECD on the user with the users own hearing instrument.

FIG. 1 shows a hearing aid comprising an ITE-part adapted to be located at or in an ear canal or the user. The ITE-part comprises or consists of an earpiece (Earpiece), also termed 'ear mould' to indicate that it is customized to the ear canal (Ear canal) of the user (e.g. manufactured by a moulding technique based on a physical or image model). The mould may e.g. be a power dome or a foam mould with a well-defined ventilation channel (e.g. for a hearing aid aimed at compensating for a severe to profound hearing loss). The earpiece (mould) comprises a throughgoing, e.g. pre-characterized (well-defined), ventilation channel (Vent) and a (throughgoing) speaker outlet (SPK-O). In the embodiment of FIG. 1, the ventilation channel is connected by a tube to a loudspeaker (SPK) of a separate part of the hearing aid (not intended for being located in the ear canal, e.g. a BTE-part adapted for being located at or behind an ear (e.g. pinna) of the user). The loudspeaker (SPK) may alternatively be located in the earpiece, in which case the speaker outlet (SPK-O) is not throughgoing, but configured to lead sound from the loudspeaker (SPK) (only) to the residual volume (RES-V) defined between the part of the earpiece facing the eardrum and the eardrum (Eardrum). The hearing aid (HA) further comprises an input transducer (here a microphone, MIC), which—during an RECD measurement—is used to pick sound played by the loudspeaker (SPK) and leaked from the residual volume to the microphone (MIC), preferably via the ventilation channel (Vent). The residual volume (RES-V) is denoted V1. A further volume of relevance to RECD measurements (in particular at low frequencies) is a part of the volume of the middle ear (Middle ear) next to the eardrum. This volume is denoted V2. This is further elaborated on below in connection with FIG. 4.

The vent in the mould and the volume of the air in the residual cavity of the occluded ear canal creates a Helmholtz resonator. The frequency of the resonance will change when the size of the vent changes or when the size of the enclosed air volume changes. If the size of vent is known and the frequency of the resonance can be measured, then the volume of the residual cavity of the ear canal can be determined, cf. FIG. 2.

Figure 2:
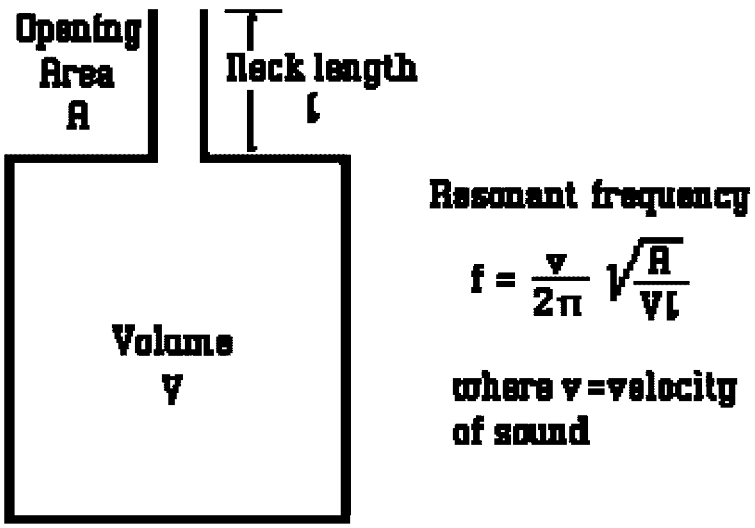

FIG. 2 shows a standard Helmholtz resonator and the relation between its resonance frequency and design parameters of the cavity and its connecting tube.

The vent in an ear mould is designed as a high pass filter (having a cut-off frequency termed the 'vent-roll-off-frequency'), so that the signal from the speaker outlet in the frequencies above the vent-roll-off-frequency is delivered to the eardrum. The low-frequency (LF) part of sound in the residual volume slips out of the ear through the vent and the high-frequency (HF) part stays in the ear. But the vent has the opposite effect on the sound from outside entering the ear canal through the vent; here the vent works as a low-pass (LP) filter. Sounds below the vent-roll-off-frequency, including the unwanted occlusion sound from the user's own voice, are, on the other hand, passed out through the vent. The frequency of this vent-roll-off is determined by the Helmholtz resonator effect of the vent size and the air volume of the residual cavity, cf. FIG. 2. As indicated in FIG. 2, the following expression for the resonance frequency $f_{res}$ of the cavity exists:

$$f_{res} = \frac{v}{2\pi}\sqrt{\frac{A}{Vl}}$$

where A is the area of the vent opening, l its length, V the internal volume of the resonator cavity, and v is the velocity of sound (e.g. 344 m/s in air at 20° C.).

Figure 3:
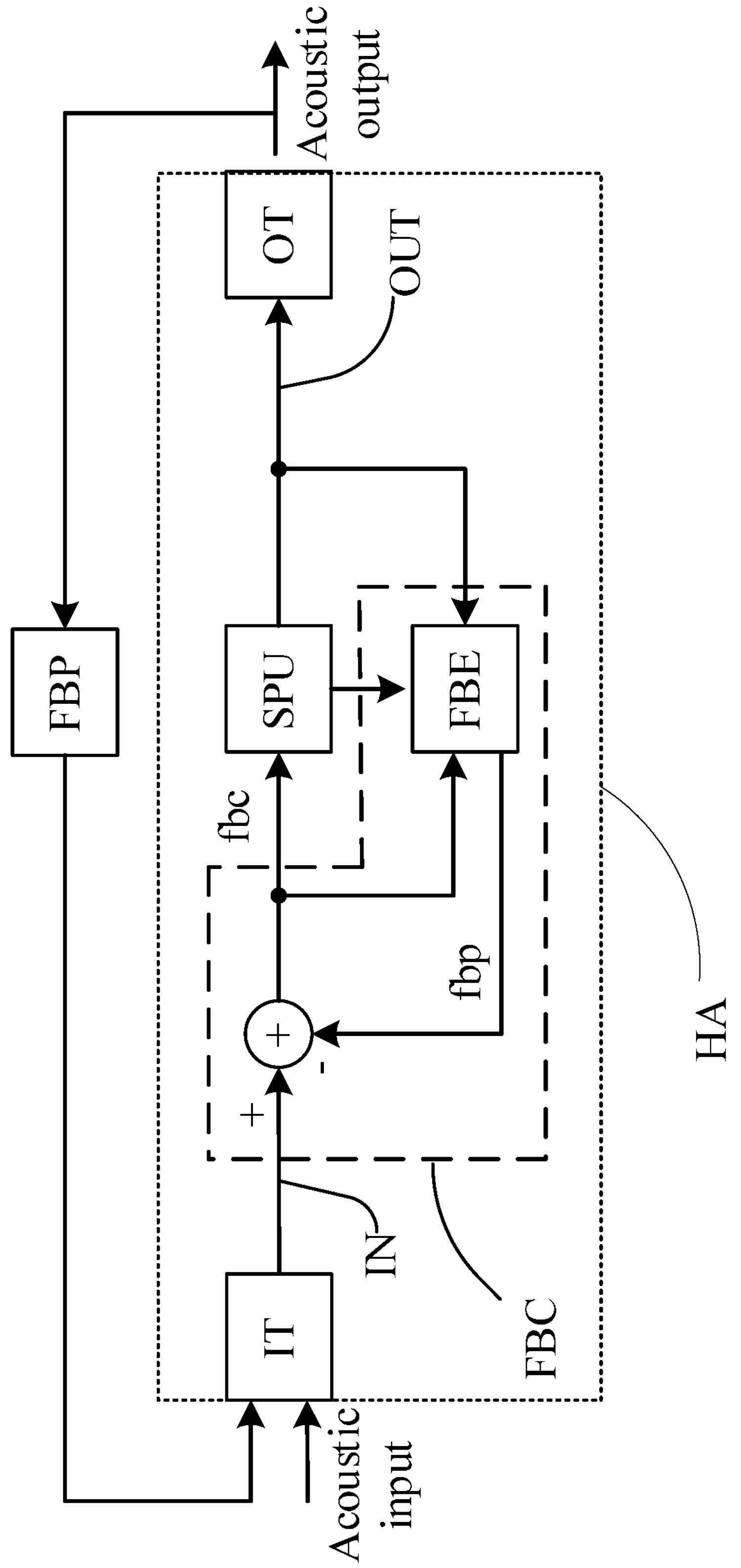
FIG. 3 shows a hearing aid comprising a feedback control system for estimating (and compensating for) a feedback path from an output transducer to an input transducer of the hearing aid.

So, a first part of a method according to the present disclosure is to measure the frequency of the Helmholtz resonator effect of the vent. And this can be done through the feedback manager system of the hearing aid that can measure and estimate the feedback path of the signal emitted by the hearing aid speaker into the ear canal, back out through the vent and back into the hearing aid microphone. FIG. 3 shows an example of how the measurement of the feedback estimate looks. The vent is an 8 mm long cylindrical vent of 2 mm in diameter. It is measure in the large IEC 711 ear simulator and the smaller 0.34 $cm^3$ volume. The volume of the IEC 711 ear simulator in the low frequencies is 1.26 $cm^3$. So, the vent-roll-off-frequency should be expected to be: For the IEC 711 Ear-Simulator (1.26 $cm^3$ Cavity):

$$f_{res} = \frac{v}{2\pi}\sqrt{\frac{A}{Vl}} = \frac{344\ \text{m/s}}{2\pi}\sqrt{\frac{\pi(0.001\ \text{m})^2}{12.6\cdot 10^{-6}\ \text{m}^3\cdot 0.008\ \text{m}}} = 966\ \text{Hz}$$

For the 0.34 $cm^3$ Cavity:

$$f_{res} = \frac{v}{2\pi}\sqrt{\frac{A}{Vl}} = \frac{344\text{ m/s}}{2\pi}\sqrt{\frac{\pi(0.001\text{ m})^2}{0.34\cdot 10^{-6}\text{ m}^3 0.008\text{ m}}} = 1860\text{ Hz}$$

FIG. 3 shows a hearing aid comprising a feedback control system for estimating (and compensating for) a feedback path from an output transducer to an input transducer of the hearing aid. FIG. 3 illustrates an example of a hearing aid (HA) is adapted to be located at or in an ear of a user and to compensate for a hearing loss of the user. The hearing aid (HA) comprises a forward path for processing an input signal representing sound in the environment. The forward path comprises at least one input transducer (IT) (e.g. one or more microphones), for picking up sound ('Acoustic input') from the environment of the hearing aid (HA) and providing respective at least one input signal (IN). The forward path further comprises a signal processor (SPU) for processing the at least one electric input signal (IN) or one or more signals originating therefrom and providing one or more processed signals (OUT) based thereon. The forward path further comprises an output transducer (OT, e.g. a loudspeaker or a vibrator) for generating stimuli perceivable by the user as sound ('Acoustic output') based on the one or more processed signals (OUT). The hearing aid (HA) further comprises a feedback control system (FBC) for feedback control (e.g. attenuation or removal). The feedback control system (FBC) comprises a feedback estimation unit (FBE) for estimating a current feedback path (FBP) from the output transducer (OT) to the input transducer (IT) and providing a (frequency dependent) estimate of the feedback path (fbp). The feedback control system further comprises a combination unit (here a summation unit, '+') for combining the electric input signal (IN) or a signal derived therefrom and the estimate of the feedback path (fbp) (here subtracting feedback path estimate fbp from input signal IN), to provide a resulting feedback corrected signal (fbc). The feedback estimation unit (FBE) may e.g. be implemented by an adaptive filter comprising an adaptive algorithm (e.g. LMS or NLMS) for determining updated filter coefficients in dependence of the feedback corrected signal (fbc) and the processed (output) signal (OUT). The updated filter coefficients are applied to a variable filter part of the adaptive filter, which provides the estimate of the feedback path (fbp), when filtering the processed (output) signal (OUT).

Figure 4A:
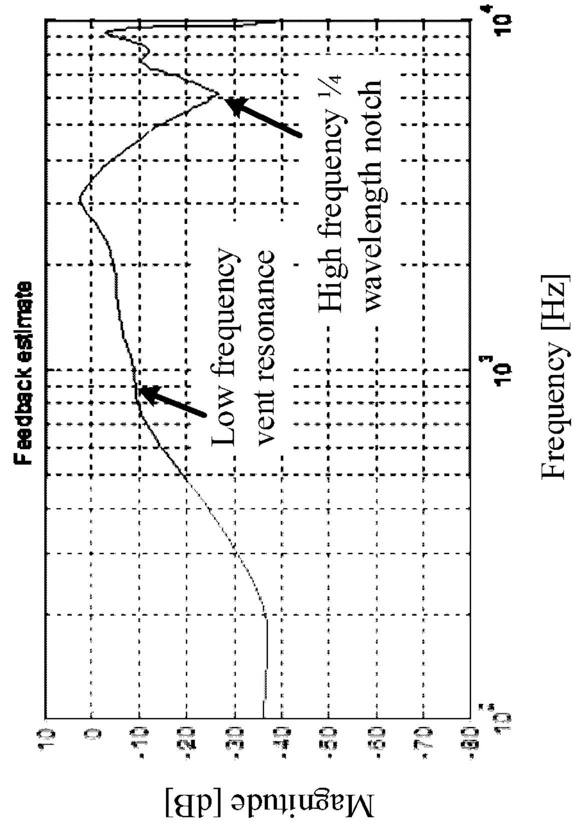
FIG. 4A shows an example of a feedback estimate measurement in a relatively large ear (711-ear simulator, 1.26 $cm^3$ volume) for a vent that is 8 mm long and having an opening diameter of 2 mm.
Figure 4B:
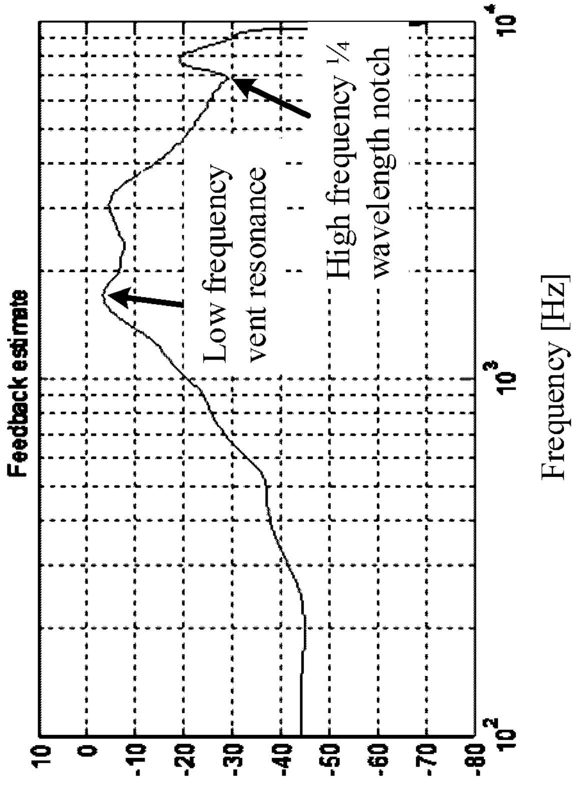
FIG. 4B shows an example of a feedback estimate measurement in a small relatively ear (0.34 $cm^3$ volume) for a vent that is 8 mm long and having an opening diameter of 2 mm.

The measurement results in FIG. 4A, 4B prove to be very close to the calculated roll-off-frequencies.

FIG. 4A shows an example of a feedback estimate measurement in a relatively large ear (711-ear simulator, 1.26 $cm^3$ volume) for a vent that is 8 mm long and having an opening diameter of 2 mm; and FIG. 4B shows an example of a feedback estimate measurement in a small relatively ear (0.34 $cm^3$ volume) for a vent that is 8 mm long and having an opening diameter of 2 mm.

In both of FIGS. 4A and 4B, a 'low frequency vent resonance' and a 'high frequency ¼ wavelength notch' are indicated in the feedback (path) estimates vs. frequency plots. In other words, an estimate of the 'low frequency level' of the RECD vs. frequency is approximated by the low-frequency-roll-off-resonance frequency extracted from the feedback path estimate, and the 'high frequency level of the RECD vs. frequency is approximated by the 'quarter wavelength notch at a relatively high frequency' in the feedback path estimate.

A further part of the present disclosure relates to improving the high frequency part of the RECD estimate. If the residual cavity of the ear canal (cf. RES-V (V1) in FIG. 1) were a constant volume at all frequencies, then it would be sufficient to just estimate the volume from the low frequency vent-roll-off-frequency. At relatively low frequencies, e.g. <1 kHz, the eardrum is acoustically quite loose, so the total volume that affects the Helmholtz resonator frequency is the combined volume of the residual cavity of the ear canal and the volume of the middle ear (cf. V1+V2 in FIG. 1). At relatively high frequencies, e.g. >3 kHz, the volume affecting the RECD is confined to the residual cavity of the ear canal between the ear mould and the eardrum (cf. V1 in FIG. 1). Here the quarter wavelength cancellation notch is created by the interference of the emitted sound of the speaker and the reflected sound of the eardrum. This creates a notch in the frequency response at the distance equal to the quarter of the wavelength (cf. FIG. 3A, 3B). This information is used to give a better estimate of the high frequency RECD level.

The absolute level of the feedback is dependent of the location of the hearing aid microphone and is therefore not a reliable measure for the RECD estimation. But in the present disclosure, the level of the feedback is not used, but solely the frequency of the low frequency-roll-off and the high-frequency-quarter-wavelength-notch that is independent of the microphone location outside the ear. The location of the microphone will of course affect the signal strength of the measurement, so a microphone location similar to an ITE style would be better than a BTE style.

FIG. 5 shows a flow diagram of an embodiment of a method of estimating a real ear to coupler difference in a hearing aid adapted to be worn by a user.

The method may comprise one or more of the following features alone or in combination:

A. The vent size needs to be known to be able to calculate the volume of the ear. Either the HCP types in the current vent size, or a specific RECD mold is created that includes a well-defined vent, that is only used during the RECD measurement. This makes sense for small children or babies that usually do not have a vent in their ear-mold. The mould could be a foam mold with a vent, since foam is good at ensuring no additional leakage.

B. Use the feedback manager to measure the frequency of the low frequency roll off resonance, to determine the low frequency volume.

C. Use the feedback manager to measure the frequency of the quarter wavelength notch in the high frequencies, and in combination with the low frequency volume then determine the high frequency volume.

D. Use the volumes measured in B. and/or C. to determine the RECD values. These RECD values could be based on a selection from a set of predefined standard RECD values or could be calculated based on the determined volumes.

FIG. 5 shows an embodiment of a method of estimating a real-ear-to-coupler-difference (RECD) in a hearing aid adapted to be worn at an ear of a user. The hearing aid comprises an input transducer for converting input sound to an electric input signal representative of said input sound;

an output transducer for providing output sound in dependence of said input sound; and an ITE-part adapted for being located fully or partially in an ear canal of the user, and to define a residual volume in said ear canal between the ITE-part and an eardrum of the user when the ITE-part is mounted in the ear canal of the user; and to provide that said output sound is delivered to said residual volume when the ITE-part is mounted in the ear canal of the user.

The method comprises providing an (e.g. customized) earpiece configured to fit tightly to walls of said ear canal of the user and to provide said residual volume when mounted in said ear canal of the user;

providing that the earpiece comprises at least one ventilation channel configured to allow an exchange of air between said residual volume and an environment of the hearing aid;

providing characteristics of the at least one ventilation channel;

providing that said earpiece comprises a sound outlet allowing sound from said output transducer to be played into said residual volume;

providing that the output transducer plays sound into the residual volume when the earpiece is mounted in the ear canal of the user;

providing that the input transducer is mounted at the user's ear to enable it to pick up feedback sound from the residual volume played by said output transducer and propagated via said at least one ventilation channel;

and based thereon providing a frequency dependent feedback path estimate representative of a leakage of sound from said output transducer to said input transducer through said ventilation channel at least in dependence of the feedback signal picked up by said input transducer;

estimating a low-frequency-roll-off-resonance frequency from said feedback path estimate;

estimating a low-frequency RECD value in dependence of said estimated low-frequency-roll-off-resonance frequency;

estimating a quarter wavelength notch at a relatively high frequency from the feedback path estimate;

estimating a high-frequency RECD value in dependence of said estimated quarter wavelength notch;

determining a multitude of estimated frequency dependent RECD values in dependence of said estimated low-frequency RECD value, and said estimated high-frequency RECD value.

Figure 6:
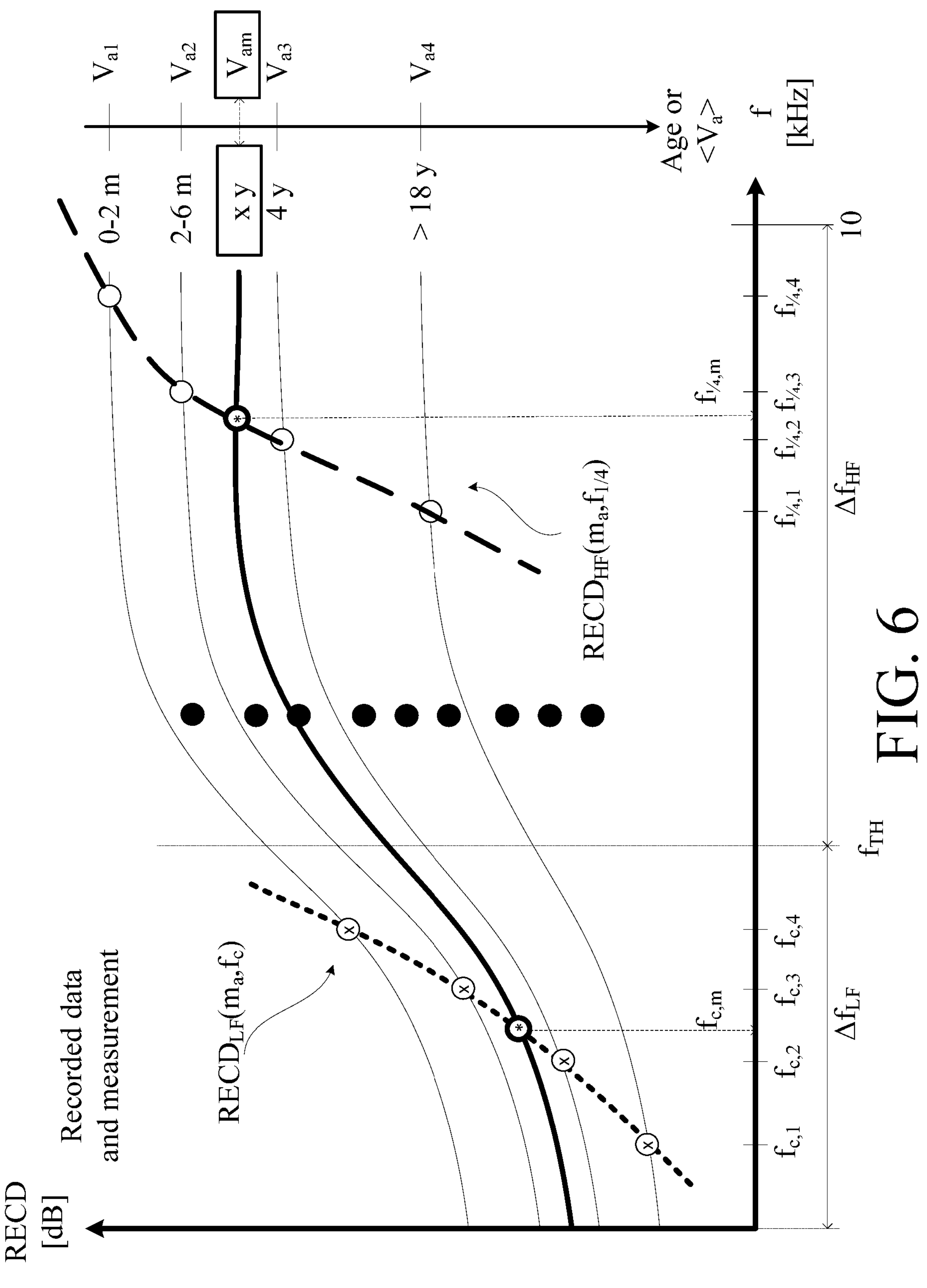

The step of determining a multitude of estimated frequency dependent RECD values in dependence of the estimated low-frequency RECD value, and the estimated high-frequency RECD value may be performed as indicated in FIG. 6 and as described below.

The method may be used for ITE-style hearing aids, e.g. CIC, RIC, etc., where the hearing aid is constituted by a an ITE-part (e.g. comprising or being constituted by an earpiece) configured to be located at or in the ear canal of the user (e.g. having the form of an ear mould, e.g. customized to the form of the user's ear canal). The method may also be used for BTE-style hearing aids, where the hearing comprises a BTE- as well as an ITE-part (e.g. comprising or being constituted by an earpiece) connected to each other either electrically (e.g. by an electric cable) or mechanically (e.g. by an acoustic tube).

FIG. 6 schematically shows exemplary recorded data for RECD versus frequency for different ear canal sizes (e.g. residual volume).

The size of the volume (cf. average volume $<V_a>$ in FIG. 6, or V1, V2, or residual volume (RES-V=V1) in FIG. 1) itself is not the target value to determine but rather the RECD value (cf. RECD [dB] in FIG. 6). The RECD frequency response is expected to be a smooth response as exemplified in FIG. 6 for different volume sizes corresponding to typical ages of children, and adults, cf. volumes $V_{a1}$, $V_{a2}$, $V_{a3}$, $V_{a4}$ (and corresponding ages 0-2 months, 2-6 months, 4 years, >18 years. The number of data sets may of course be larger (or smaller) in dependence of the level of accuracy aimed at. The RECD curve usually start at a lower level in the low frequencies and raises to a higher level in the higher frequencies, following the theory of the ear drum being stiff in the higher frequencies, confining the effective volume to the residual cavity (RES-V=V1 in FIG. 1) of the ear canal, and loose in the lower frequencies resulting in the effective volume to also include the middle ear (V2 in FIG. 1). So having determined the LF Helmholtz resonance frequency ($f_{c,1}$, $f_{c,2}$, $f_{c,3}$, $f_{c,4}$) and the HF quarter wave cancellation frequency ($f_{1/4,1}$, $f_{1/4,2}$, $f_{1/4,3}$, $f_{1/4,4}$) for the captured data (different volumes ($V_{a1}$, $V_{a2}$, $V_{a3}$, $V_{a4}$)/ages), it is possible to select the $RECD_{LF}$ and an $RECD_{HF}$ value and interpolate/extrapolate the rest of the RECD curve. E.g. if—based on the feedback path estimation data—the measured LF resonance frequency, $f_{c,m}$, is between $f_{c,2}$ and $f_{c,3}$, then the LF RECD values is between $RECD_{LF}(f_{c,2})$ and $RECD_{LF}(f_{c3})$, and if the high frequency quarter wave cancellation frequency, $f_{1/4,m}$, is measured to be between $f_{1/4,2}$ is $f_{1/4,3}$, then $RECD_{HF}$ value is between $RECD_{HF}(f_{1/4,2})$ and $RECD_{HF}(f_{1/4,3})$ and the individual RECD curve for the ear is estimated.

A larger or smaller number of empirical RECD curves for different residual volumes ($V_{ai}$≈child ages) and possibly different acoustic masses ($m_a$) of the ventilation channels (representative of the vent size) and corresponding LF Helmholtz resonance frequencies ($f_{c,i}$) and HF quarter wave cancellation frequencies ($f_{1/4,1}$) are recorded (c.f. schematic representation in FIG. 6), such data may be used to select appropriate data, e.g. an appropriate curve (or interpolated curve), using the 'measured' low-frequency-roll-off-resonance frequency ($f_{c,m}$) and the quarter wavelength notch at a relatively high frequency ($f_{1/4,m}$) from the feedback path estimate as defined by the method according to the present disclosure. In other words, the LF Helmholtz resonance frequency ($f_{c,i}$) and the HF quarter wave cancellation frequency ($f_{1/4,i}$) of the empirical RECD curves are estimated by the low-frequency-roll-off-resonance frequency and the quarter wavelength notch at a relatively high frequency, respectively, as derived from the feedback path estimate as defined by the method according to the present disclosure.

As an example, the RECD estimate may be found in the following way based on the feedback measurements performed by the hearing aid and stored empirical data:

Low frequency (LF) part of RECD: It is well known that the sound pressure in a small, enclosed cavity like an ear canal emitted from a known sound source (like a hearing aid speaker) will increase 6 dB in sound pressure level (SPL), if the volume is halved. This is especially true in the lower frequencies where the wavelength is much longer than the cavity dimensions. So, the LF-RECD level in the ear canal can be determined as:

$$RECD_{ear,LF} = 20\log_{10}\left(\frac{V_{2cc}}{V_{ear}}\right)$$

Hence, if $V_{ear}$ is half of $V_{2cc}$, then $RECD_{ear,LF}$ is 6 dB. And based on the description of the acoustic resonance properties of a cavity in relation to FIG. 2 and the expression for the resonance frequency $f_{res}$ of the cavity (wherein the resonance frequency $f_{res}$ of the cavity is approximated by the low-frequency-roll-off-resonance frequency extracted from the feedback path estimate, e.g. where it starts to decline 12 dB/oct in the LF (e.g. below 3 or 2 kHz), we get:

$$RECD_{ear,LF} = 20\log_{10}\left(V_{2cc}\frac{l}{A}\left(f_{res,LF}\frac{2\pi}{v}\right)^2\right)$$

The high frequency part of the RECD estimate, is determined using the quarter wavelength notch frequency, either based on a lookup table that correlates the quarter wavelength notch frequency to a high frequency RECD value (wherein the quarter wavelength notch frequency $f_{1/4}$ is approximated by the quarter wavelength notch at a relatively high frequency (e.g. in the range 3-9 kHz) from the feedback path estimate). This is also illustrated in FIG. 6. This correlation can be determined by measuring the notch frequency in a range of well-defined cavities, representing different ear canal sizes and shapes or through numerical simulation of different ear canal sizes and shapes.

Figure 7:
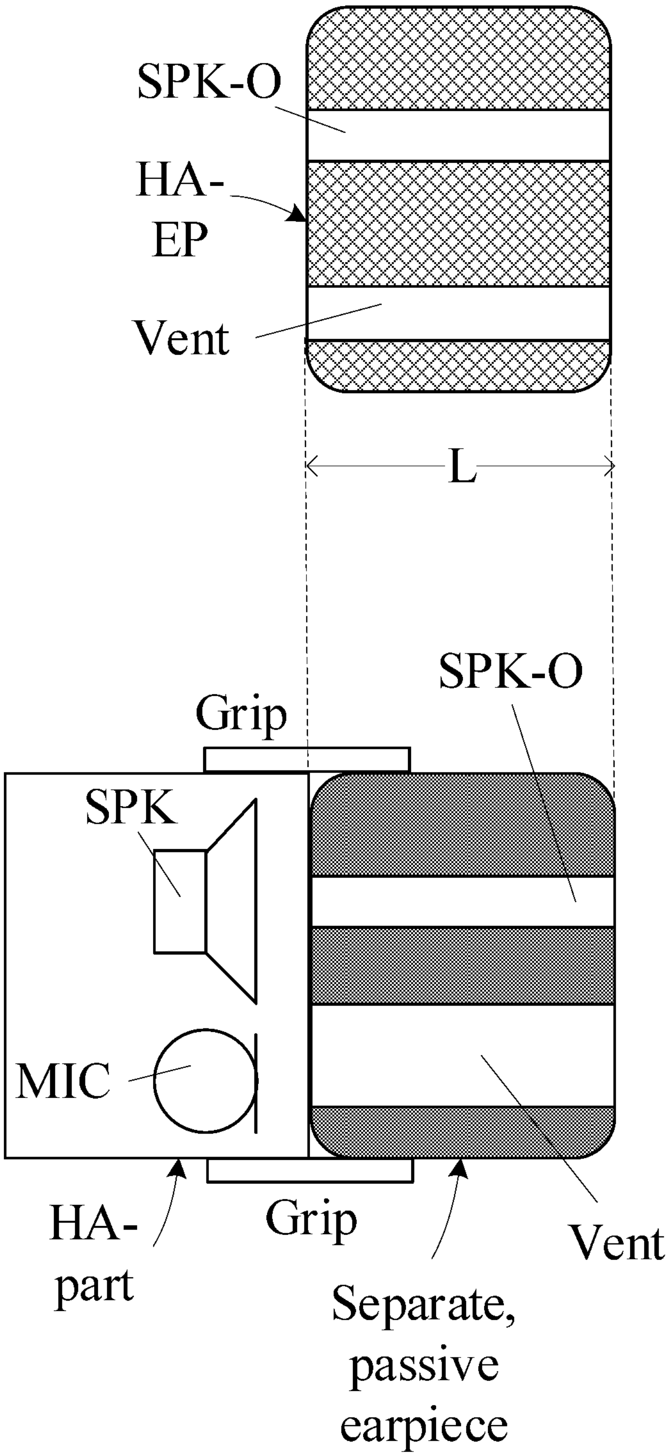
FIG. 7 shows an embodiment of a hearing aid earpiece combination according to the present disclosure.

FIG. 7 shows an embodiment of a hearing aid earpiece combination according to the present disclosure. The earpiece (denoted 'Separate, passive earpiece' in the bottom part of FIG. 7) is a separate earpiece specifically adapted to support estimating said real-ear-to-coupler-difference in the hearing aid. The separate earpiece may e.g. be an ear mould specifically adapted to the user's ear, but not used in normal operation of the hearing aid (or it may be a standard piece that is adaptable to the form and size of the user" ear canal (e.g. made of a flexible material, such as silicone or foam (e.g. disposable)). The separate earpiece may e.g. be a passive earpiece as indicated in the lower part of FIG. 7 (in the sense that it does not comprise any components requiring power supply (e.g. from a battery or other energy source). The separate (e.g. customized) earpiece preferably has the same form (and dimensions) and speaker outlet (SPK-O) as the earpiece (HA-EP) of the hearing aid in question (for which the RECD measurement is intended to be used), cf. top part of FIG. 7. In particular, the form and dimension (L) of the earpiece is preferably configured to provide that, when mounted in the ear canal of the user, it occludes the same residual volume (cf. RES-V (V1) in FIG. 1) as when the earpiece of the hearing aid is mounted in the user's ear canal (cf. 'Ear canal' in FIG. 1). The separate earpiece further comprises a ventilation channel (Vent) having predefined characteristics.

The separate earpiece may comprise an element (Grip) for (mechanically) attachment to the hearing aid part (HA-part) comprising a microphone (MIC) for picking up sound reflected from the eardrum and propagated through the vent and a loudspeaker (SPK) for propagating sound through the vent to the eardrum. The hearing aid part (HA-part) may be a BTE-part adapted for being located at or behind the ear (pinna), and/or an ITE-part adapted for being located in the ear canal (comprising the loudspeaker (SPK) and possibly a microphone (MIC)).

The hearing aid may be a so-called BTE-style comprising a BTE-part adapted for being located at or behind the ear (pinna) and an ITE-part adapted for being located in the ear canal (e.g. a customized ear mould), the BTE-part and the ITE-part being connected by an acoustic tube for propagating sound from a loudspeaker located in the BTE-part to the speaker outlet (SPK-O) in the ITE-part (mould). Thereby sound from the speaker outlet (SPK-O) can reach the residual volume and hence the eardrum (cf. e.g. RES-V and 'Eardrum', respectively, in FIG. 1).

The hearing aid may also be implemented as a so-called receiver in the ear (RITE), or a receiver in the canal (RIC), or a completely in the ear canal (CIC) style hearing aid, and hence the (measurement) earpiece (e.g. mould) may be adapted for such styles (e.g. having a fixed vent size).

The earpiece (HA-EP) of the hearing aid may have a single ventilation channel (Vent), preferably having known characteristics (not necessarily being identical to those of the separate earpiece). The earpiece (HA-EP) of the hearing aid may have other ventilation structures, e.g. comprising more than one channel, or more dome like structures with a multitude of openings.

In case the ventilation effect of the openings of the earpiece of the hearing aid are not fully characterized, the following section discloses a method of estimating an effective vent size using feedback estimation.

Figure 8:
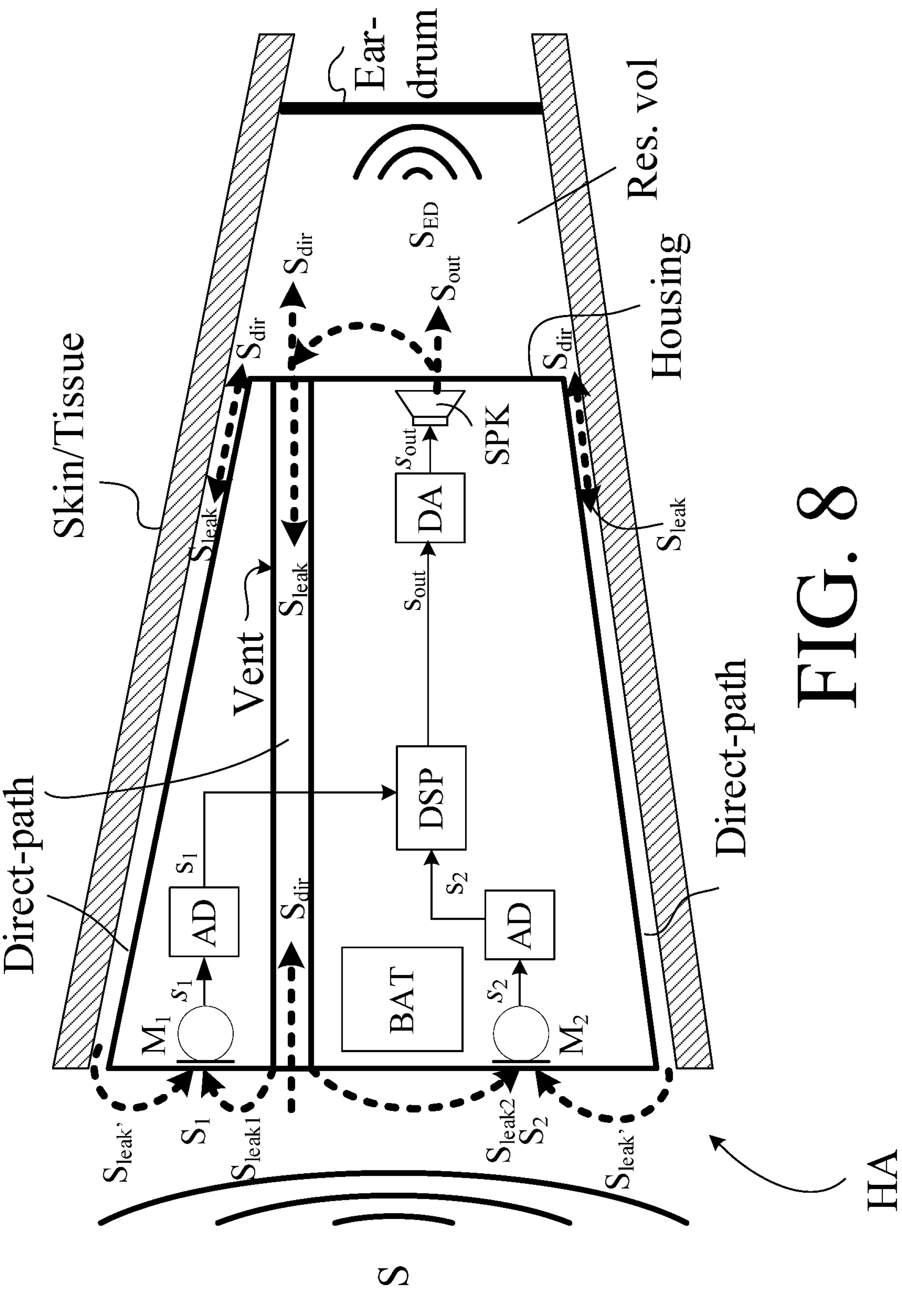
FIG. 8 shows an embodiment of a hearing aid adapted for being inserted in the ear canal of a user.

Estimation of an Effective Vent Size:

FIG. 8 shows an embodiment of a hearing aid adapted for being inserted in the ear canal of a user. In any open hearing aid fitting the audiological compensation should be matched to the size of the ventilation channel (here termed 'vent'). This determines correct amplification level & vent compensation, feedback handling, etc. The so-called "comb-filter" sound quality degradation is caused by the interference between the sound travelling through the vent and the sound amplified by the hearing aid (see e.g. $S_{dir}$, $S_{out}$, respectively, in FIG. 8). Alleviating the comb-filter sound quality issue relies on a well-known effective vent size as determined by the daily insertion of the hearing instrument (variations in insertion depth and angle and cleanliness of ear and vent openings).

Certain characteristics, e.g. physical dimensions, are associated with a vent channel (cf. 'Vent' in FIG. 8) in a hearing aid body or in the earpiece or in the opening(s) in a dome mounted on the speaker unit of a receiver-in-the-ear (RITE) style hearing instrument or on the tip of a "thin tube" hearing instrument. These dimensions provide part of the ventilation or venting of the ear (when a hearing aid is mounted).

The other important contribution is associated with leakages around the earpiece or dome or in-ear instrument body (cf. '$S_{leak}$', '$S_{dir}$' in FIG. 8). Hence, the smaller the vent channel is, the more important it may be, if leakage exists, since such a leakage may in fact be the dominating part of the ventilation of the residual cavity (cf. 'Res. vol' in FIG. 8) behind the hearing instrument (i.e. between the eardrum (cf. 'Ear-drum' in FIG. 8) and the hearing instrument/earpiece (cf. 'Earpiece' in FIG. 8).

Lastly, the physical dimensions of vent channel, etc., is in practice very often partially blocked by dirt or earwax.

In conclusion, the actual effective vent size—understood as the combined effect of the predetermined ventilation, leakages as well as dirt etc. in the vent channel—varies on a daily basis or even more frequent as the physical conditions change. The earpiece may slide a little in the ear, the device may be removed and reinserted, humidity may build up and partially block the vent channel, etc.

FIG. 8 schematically shows an embodiment of a hearing aid (HD) according to the present disclosure. The hearing aid (HD) comprises or consists of an ITE-part ('Earpiece') comprising a housing ('Housing'), which may be a standard housing aimed at fitting a group of users, or it may be customized to a user's ear (e.g. as an ear mould, e.g. to provide an appropriate fitting to the outer ear and/or the ear canal). The housing schematically illustrated in FIG. 8 has a symmetric form, e.g. around a longitudinal axis from the environment towards the eardrum ('Eardrum') of the user (when mounted), but this need not be the case. It may be customized to the form of a particular user's ear canal. The hearing aid may be configured to be located in the outer part of the ear canal, e.g. partially visible from the outside, or it may be configured to be located completely in the ear canal, possibly deep in the ear canal, e.g. fully or partially in the bony part of the ear canal.

To minimize leakage of sound (played by the hearing aid towards the eardrum of the user) from the ear canal, a good mechanical contact between the housing of the hearing aid and the Skin/tissue of the ear canal is aimed at. In an attempt to minimize such leakage, the housing of the earpiece may be customized to the ear of a particular user. Nevertheless, leakage of sound ($S_{leak}$) may occur when the earpiece is not optimally mounted on the user (occasionally, e.g. during jaw movements, e.g. chewing).

The hearing aid (HD) of FIG. 8 comprises a forward path comprising two microphones ($M_1$, $M_2$) located in the housing with a predefined distance d between them, e.g. 8-10 mm, e.g. on a part of the surface of the housing that faces the environment when the hearing aid is operationally mounted in or at the ear of the user. Other embodiments may comprise one microphone or three or more microphones. The microphones ($M_1$, $M_2$) are e.g. located on the housing to have their microphone axis (an axis through the centre of the two microphones) point in a forward direction relative to the user, e.g. a look direction of the user (as e.g. defined by the nose of the user, e.g. substantially in a horizontal plane), when the hearing aid is mounted in or at the ear of the user. Thereby the two microphones are well suited to create a directional signal towards the front (and or back) of the user. The microphones are configured to convert sound ($S_1$, $S_2$) received from a sound field S around the user at their respective locations to respective (analogue) electric signals ($s_1$, $s_2$) representing the sound. The microphones are coupled to respective analogue to digital converters (AD) to provide the respective (analogue) electric signals (s1, s2) as digitized signals (s1, s2). The digitized signals may further be coupled to respective filter banks to provide each of the electric input signals (time domain signals) as frequency sub-band signals (frequency domain signals). The (digitized) electric input signals ($s_1$, $s_2$) are fed to a digital signal processor (DSP) for processing the audio signals ($s_1$, $s_2$), e.g. including one or more of spatial filtering (beamforming), (e.g. single channel) noise reduction, compression (frequency and level dependent amplification/attenuation according to a user's needs, e.g. hearing impairment), spatial cue preservation/restoration, etc. The digital signal processor (DSP) may e.g. comprise the appropriate filter banks (e.g. analysis as well as synthesis filter banks) to allow processing in the frequency domain (individual processing of frequency sub-band signals). The digital signal processor (DSP) is configured to provide a processed signal $s_{out}$ comprising a representation of the sound field S (e.g. including an estimate of a target signal therein). The processed signal $s_{out}$ is fed to an output transducer (here a loudspeaker (SPK), e.g. via a digital to analogue converter (DA), for conversion of the processed (digital electric) signal $s_{out}$ (or analogue version $s_{out}$) to a sound signal $S_{out}$.

The hearing aid (HD) comprises a venting channel (Vent) configured to minimize the effect of occlusion (when the user speaks). In addition to allowing an (un-intended) acoustic propagation path from a residual volume (cf. 'Res. Vol' in FIG. 8) between a hearing aid housing and the eardrum to be established, the venting channel also provides a direct acoustic propagation path of sound from the environment to the residual volume. The directly propagated sound $S_{dir}$ reaching the residual volume is mixed with the acoustic output $S_{out}$ of the hearing aid (HD) to create a resulting sound $S_{ED}$ at the eardrum. In a mode of operation, active noise suppression (ANS) may be activated in an attempt to cancel out the directly propagated sound $S_{dir}$.

In addition to the external sound ($S_1$, $S_2$), the microphones ($M_1$, $M_2$) also receive (and pick up) sound ($S_{leak1}$, $S_{leak2}$) leaked from the output transducer (SPK) of the hearing aid e.g. via the vent (Vent) and/or other leakage paths (e.g. along the walls of the ear canal, denoted $S_{leak'}$ in FIG. 8) from the residual volume (Res. Vol) at the eardrum to the respective microphones ($M_1$, $M_2$). The leakage paths represented by leaked sound ($S_{leak1}$, $S_{leak2}$, $S_{leak'}$) may be estimated by the hearing aid via a feedback estimation unit (FE), and the resulting estimates may be subtracted from the respective microphone signals ($s_1$, $s_2$), as is known in the art. The ventilation channel (Vent) is in the exemplary embodiment of FIG. 8 asymmetrically located in the hearing aid housing (Housing). The first microphone ($M_1$) is located closer to the ventilation channel than the second microphone ($M_2$), leading to a feedback measure of the first microphone ($M_1$) being larger than the feedback measure of the second microphone ($M_2$), at least above a minimum frequency. Such asymmetric location may be a result of a design constraint due to components of the hearing aid, e.g. a battery. A symmetric placement may be aimed at instead. Thereby the first and second microphones ($M_1$, $M_2$) have different feedback paths from the loudspeaker (SPK).

The hearing aid (HD) comprises an energy source, e.g. a battery (BAT), e.g. a rechargeable battery, for energizing the components of the device.

The present disclosure proposes to use signal processing data from a feedback estimation system (e.g. termed an anti-feedback processing system) for the purpose of evaluating the actual effective vent size. The acoustic transfer function for the vent comprises A) a controlled, relatively fixed (time-invariant), part originating from a well-defined ventilation channel, and B) a less controlled, e.g. time variant, part originating from less well-defined leakage channels, as described above.

One realisation is to estimate the acoustic feedback around the hearing instrument just after insertion in ear, e.g. as part of the start-up and initialisation process when the hearing aid is powered-up (e.g. each morning, e.g. after a recharging session).

Broadband noise or other signals with suitable frequency content may be emitted during the initialisation process of the hearing instrument and in such situation, the transfer function from receiver (loudspeaker) to microphone may be estimated (using built in components of the hearing aid, e.g. sound generator, loudspeaker, microphone, filter bank, level estimators in an open loop configuration). Preferably this measurement is done under quiet conditions in order to minimize the influence of non-hearing aid related acoustic signals on the measurement.

The transfer function may then be compared with predicted data based on the choice of transducers (microphone, loudspeaker) in the hearing aid and representing relevant venting situations.

The effective vent size estimate is obtained from such a comparison of estimated transfer function with predicted data. The predicted data may be stored in the hearing aid or in another connected storage such as a smartphone. Alternatively, the data analysis may be made on the basis of a direct calculation of data representing different effective vent sizes, and in this way less storage is required but better accuracy is obtained and the number of operations in the calculations increases.

The described analysis can be done over the frequency range covered by the hearing aid. Alternatively, this process can be done in the frequency range below 2 kHz since experience and acoustic simulations reveal that above 2 kHz the vent size is less important for the acoustic output.

Another realisation is to exploit an online feedback management system of the hearing aid, which may be configured to monitor the feedback loop during the daily use of the hearing instrument, cf. FIG. 8.

Figure 9:
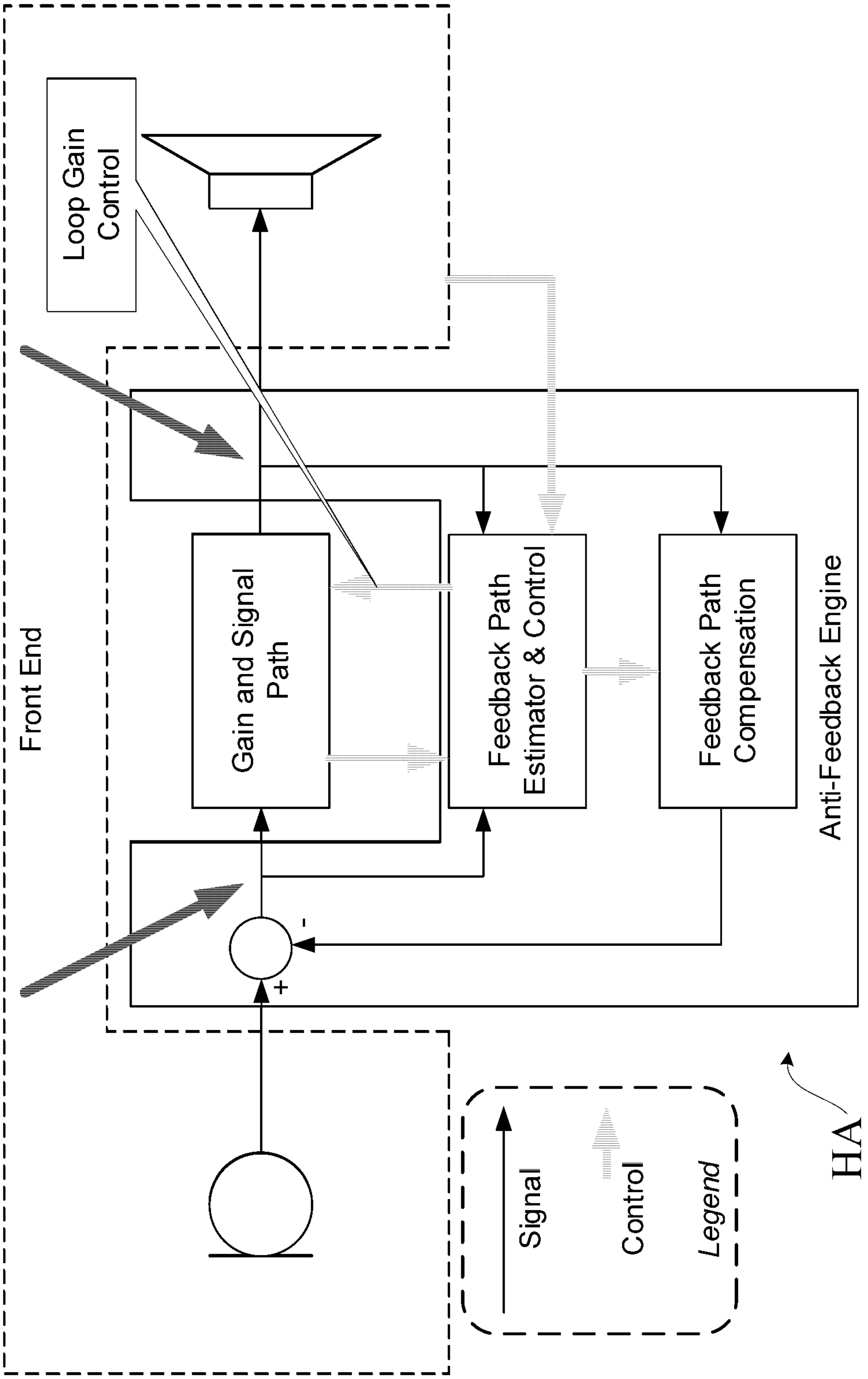
FIG. 9 shows an example of an anti-feedback engine principle for estimating an effective vent size in a hearing aid.

FIG. 9 shows an example of an anti-feedback engine principle for estimating an effective vent size in a hearing aid.

The feedback path compensation may be temporarily frozen during vent estimation, meaning that the parameters in the "Feedback Path Compensation"-block are put temporarily on hold.

This closed loop monitoring of the instantaneous acoustic performance generates estimates of the acoustic feedback path as part of the state of the art concept of utilizing feedback path estimations for counteracting the feedback in the hearing aid. The feedback path estimates are influenced by the environment and are therefore expected to vary during the day. Hence, averaging may be required and the hearing instrument may be set up to perform an estimate several times a day such as every hour. The results may be pooled and when a clear tendency towards a change in effective vent is seen, the audiological processing may be adjusted accordingly.

Figure 10:
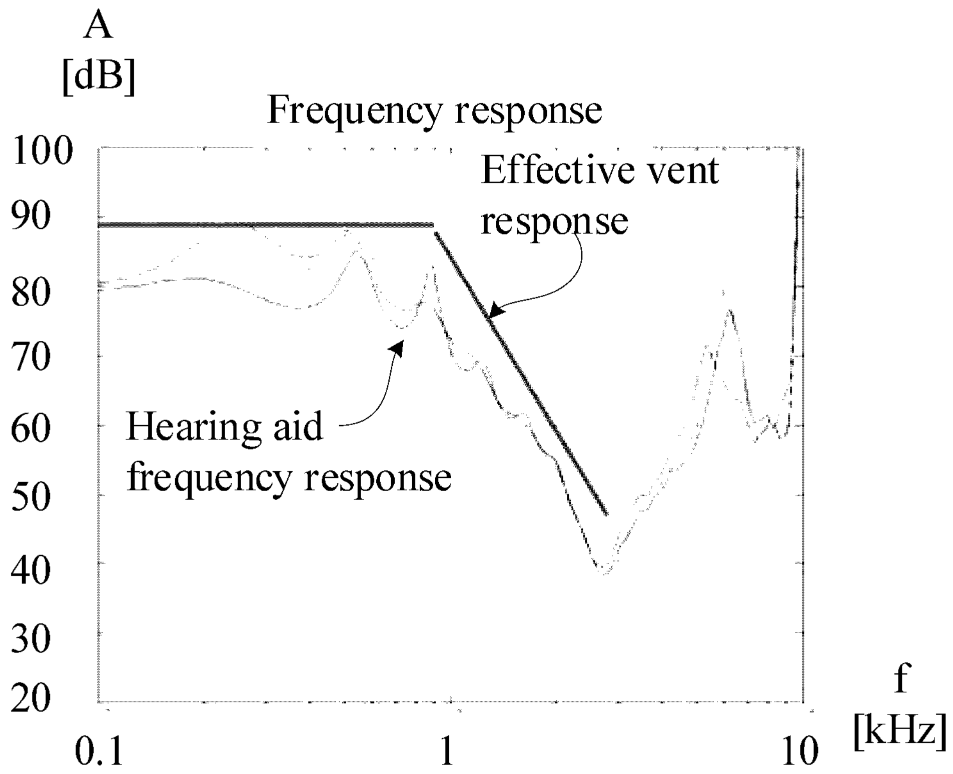
FIG. 10 shows a frequency response for a hearing instrument (thin solid curves) and approximate curve (bold piecewise linear, ski-slope, graph) representing an effective vent size.

In one embodiment, the feedback path estimation process is reconfigured during vent estimation: Feedback path estimation is optimized for the purpose by configuring the processing to include frequencies down to a low frequency such as 200 Hz in order to facilitate estimates of the corner frequency as shown in the example in FIG. 10. FIG. 10 shows a frequency response for a hearing instrument (thin solid curves, and an approximate curve (bold piecewise linear, ski-slope, graph) representing an effective vent size.

This is in contrast to the purpose of estimating feedback path for the sake of optimal feedback suppression where a lower limiting in the order of 1 or 2 kHz may be considered to be optimal.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The step of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP3038384A1 (Oticon) 29 Jun. 2016

[Dillon; 2001] Dillon H. (2001), Hearing Aids, Thieme, New York-Stuttgart, 2001.

The invention claimed is:

1. A method of estimating a real-ear-to-coupler-difference (RECD) in a hearing aid adapted to be worn at an ear of a user, the hearing aid comprising an input transducer for converting input sound to an electric input signal representative of said input sound;

an output transducer for providing output sound in dependence of said input sound; and an ITE-part adapted for being located fully or partially in an ear canal of the user; and to define a residual volume in said ear canal between the ITE-part and an eardrum of the user when the ITE-part is mounted in the ear canal of the user; and to provide that said output sound is delivered to said residual volume when the ITE-part is mounted in the ear canal of the user;

the method comprising providing an earpiece configured to fit tightly to walls of said ear canal of the user and to provide said residual volume when mounted in said ear canal of the user;

providing that the earpiece comprises at least one ventilation channel or opening configured to allow an exchange of air between said residual volume and an environment of the hearing aid;

providing that said earpiece comprises a sound outlet allowing sound from said output transducer to be played into said residual volume;

providing characteristics of the at least one ventilation channel or opening;

providing that the output transducer plays sound into the residual volume when the earpiece is mounted in the ear canal of the user;

providing that the input transducer is mounted at the user's ear to enable it to pick up feedback sound from the residual volume played by said output transducer and propagated via said at least one ventilation channel or opening;

and based thereon providing a frequency dependent feedback path estimate representative of a leakage of sound from said output transducer to said input transducer through said ventilation channel or opening at least in dependence of the feedback signal picked up by said input transducer, estimating a low-frequency-roll-off-resonance frequency from said feedback path estimate;

estimating a low-frequency RECD value in dependence of said estimated low-frequency-roll-off-resonance frequency;

estimating a quarter wavelength notch at a relatively high frequency from the feedback path estimate;

estimating a high-frequency RECD value in dependence of said estimated quarter wavelength notch;

determining estimated frequency dependent RECD values in dependence of said estimated low-frequency RECD value and said estimated high-frequency RECD value.

2. A method according to claim 1 wherein a threshold frequency ($f_{TH}$) is defined between a low-frequency region and a high frequency region, wherein the low-frequency-roll-off-resonance frequency is a frequency in the low-frequency region below the threshold frequency ($f_{TH}$), and he quarter wavelength notch at a relatively high frequency is a frequency in the high-frequency region above the threshold frequency ($f_{TH}$).

3. A method according to claim 2 wherein the low-frequency-roll-off-resonance frequency is in a range between 500 Hz and 1.5 kHz, and the quarter wavelength notch at a relatively high frequency is in a range between 5 kHz and 8 kHz.

4. A method according to claim 2 wherein the threshold frequency ($f_{TH}$) is in the range between 2 kHz and 4 kHz.

5. A method according to claim 1 comprising providing said estimated frequency dependent RECD values in dependence of said estimated low-frequency RECD value and said estimated high-frequency RECD value and predefined measured and/or simulated data for different ventilation channels or openings, and different dimensions of said residual volume.

6. A method according to claim 1 wherein the hearing aid comprises a BTE-part adapted to be located at or behind the ear of the user.

7. A method according to claim 1 wherein the ITE-part comprises said earpiece.

8. A method according to claim 1 wherein said earpiece is a separate earpiece specifically adapted to support said estimating said real-ear-to-coupler-difference in said hearing aid.

9. A method according to claim 8, wherein the separate earpiece is configured to have the same form and dimensions and speaker outlet (SPK-O) as an earpiece (HA-EP) of the hearing aid for which the RECD estimate is intended to be used.

10. A method according to claim 1 comprising

Providing an effective vent size by estimating an acoustic transfer function for the at least one ventilation channel or opening based on an estimate of the feedback path from the loudspeaker to the input transducer of the hearing aid.

11. A hearing aid adapted to be worn at and/or in an ear of a user, the hearing aid comprising an input transducer for converting input sound to an electric input signal representative of said input sound;

an output transducer for providing output sound in dependence of said input sound; and an earpiece adapted for being located fully or partially in an ear canal of the user, the earpiece being configured to define a residual volume in said ear canal between the earpiece and an eardrum of the user when the earpiece is mounted in the ear canal of the user; the earpiece comprising at least one ventilation channel or opening configured to allow an exchange of air between said residual volume and an environment of the hearing aid;

a sound outlet allowing sound from said output transducer to be played into said residual volume when the ITE-part is mounted in the ear canal of the user;

a feedback estimation system configured to provide a frequency dependent feedback path estimate representative of a leakage of sound from said output transducer to said input transducer through said ventilation channel or opening at least in dependence of the feedback signal picked up by said input transducer;

a signal processor configured to execute processing algorithms of the hearing aid and to process data and extract processing parameters to be used by at least one of said processing algorithms;

memory wherein characteristics of the at least one ventilation channel or opening of the hearing aid, and empirical data of real ear to coupler difference (RECD) values at a multitude of frequencies for different residual volumes and optionally for different characteristics of ventilation channels or openings, are stored;

wherein the input transducer is arranged in the hearing aid to enable it to pick up said leakage of sound from the residual volume played by said output transducer and propagated via said at least one ventilation channel or opening;

wherein said signal processor—at least in a specific RECD estimation mode of operation of the hearing aid—is configured to estimate frequency dependent real ear to coupler values for said hearing aid when mounted in the ear canal of the user by estimating a low-frequency-roll-off-resonance frequency from said feedback path estimate;

estimating a low-frequency RECD value in dependence of said estimated low-frequency-roll-off-resonance frequency and said stored empirical data;

estimating a quarter wavelength notch at a relatively high frequency from said feedback path estimate;

estimating a high-frequency RECD value in dependence of said estimated quarter wavelength notch and said stored empirical data; and determining estimated frequency dependent RECD values in dependence of said estimated low-frequency RECD value and said estimated high-frequency RECD value and said stored empirical data.

12. A hearing aid according to claim 11 wherein the empirical data for different residual volumes and optionally for different characteristics of ventilation channels or openings stored in memory include corresponding LF Helmholtz resonance frequencies and HF quarter wave cancellation frequencies.

13. A hearing aid according to claim 12 wherein the LF Helmholtz resonance frequency and the HF quarter wave cancellation frequency of the empirical RECD data are estimated by the low-frequency-roll-off-resonance frequency and the quarter wavelength notch at a relatively high frequency, respectively, as derived from the feedback path estimate provided by the feedback estimation system.

14. A hearing aid according to claim 11 wherein data characterizing a hearing impairment of the user are stored in memory of the hearing aid.

15. A hearing aid according to claim 11 wherein the signal processor is configured to run a fitting algorithm for determining frequency and/or level dependent gains in dependence of said data characterizing the user's hearing impairment and said estimated frequency dependent RECD values determined in the hearing aid.

16. A hearing aid according to claim 15 wherein the frequency and/or level dependent gains are stored in memory of the hearing aid and applied by the at least one processing algorithm, executed by the signal processor to compensate an electrical input signal representing sound for the user's hearing impairment and for presentation of a thus improved signal to the user as audible sound.

17. A hearing aid adapted to be worn at an ear of a user, the hearing aid comprising an input transducer for converting input sound to an electric input signal representative of said input sound;

an output transducer for providing output sound in dependence of said input sound; and an ITE-part adapted for being located fully or partially in an ear canal of the user and configured to define a residual volume in said ear canal between the ITE-part and an eardrum of the user when the ITE-part is mounted in the ear canal of the user; and comprising at least one ventilation channel or opening configured to allow an exchange of air between said residual volume and an environment of the hearing aid and to allow an exchange of air between said residual volume and an environment of the hearing aid, when the ITE-part is mounted in the ear canal of the user, and a sound outlet allowing sound to provide that said output sound is delivered to said residual volume when the ITE-part is mounted in the ear canal of the user; and a feedback estimation system configured to provide a frequency dependent feedback path estimate representative of a leakage of sound from said output transducer to said input transducer through said ventilation channel or opening at least in dependence of a feedback signal picked up by said input transducer; wherein the hearing aid is configured to estimate a low-frequency-roll-off-resonance frequency from said feedback path estimate;

estimate a low-frequency real ear to coupler difference (RECD) value in dependence of said estimated low-frequency-roll-off-resonance frequency;

estimate a quarter wavelength notch at a relatively high frequency from the feedback path estimate;

estimating a high-frequency RECD value in dependence of said estimated quarter wavelength notch;

determining estimated frequency dependent RECD values in dependence of said estimated low-frequency RECD value and said estimated high-frequency RECD value.

18. A hearing aid according to claim 17 comprising memory wherein characteristics of the at least one ventilation channel or opening of the hearing aid, empirical data of real ear to coupler difference (RECD) values at a multitude of frequencies for different residual volumes and optionally for different characteristics of ventilation channels or openings, and data characterizing a hearing impairment of the user are stored in memory of the hearing aid, are stored.

19. A hearing aid according to claim 18 configured to run a fitting algorithm for determining frequency and/or level dependent gains in dependence of said data characterizing the user's hearing impairment and said estimated frequency dependent RECD values determined in the hearing aid.

20. A hearing aid according to claim 19 wherein the frequency and/or level dependent gains are stored in memory of the hearing aid and applied by at least one processing algorithm, executed by a signal processor to compensate an electrical input signal representing sound for the user's hearing impairment and for presentation of a thus improved signal to the user as audible sound.

* * * * *